(12) United States Patent
Bianchi et al.

(10) Patent No.: US 9,538,725 B2
(45) Date of Patent: Jan. 10, 2017

(54) MOBILE TELEPHONE DOG TRAINING TOOL AND METHOD

(71) Applicant: EB Partners, Austin, TX (US)

(72) Inventors: James C. Bianchi, Karnes City, TX (US); Robert W. Holland, Austin, TX (US)

(73) Assignee: EB Partners, Austin, TX (US)

( * ) Notice: Subject to any disclaimer, the term of this patent is extended or adjusted under 35 U.S.C. 154(b) by 329 days.

(21) Appl. No.: 14/462,882

(22) Filed: Aug. 19, 2014

(65) Prior Publication Data

US 2015/0053144 A1 Feb. 26, 2015

Related U.S. Application Data

(63) Continuation-in-part of application No. 13/901,934, filed on May 24, 2013, now Pat. No. 8,839,744, which is a continuation-in-part of application No. 13/790,548, filed on Mar. 8, 2013.

(51) Int. Cl.
| | |
|---|---|
| *A01K 15/02* | (2006.01) |
| *A01K 11/00* | (2006.01) |
| *G01S 19/14* | (2010.01) |
| *G01S 19/34* | (2010.01) |

(52) U.S. Cl.
CPC .......... *A01K 15/021* (2013.01); *A01K 11/008* (2013.01); *G01S 19/14* (2013.01); *G01S 19/34* (2013.01)

(58) Field of Classification Search
CPC .. A01K 15/023; A01K 15/021; A01K 11/008; A01K 15/02; G08B 21/0277; G08B 21/0283

USPC .......... 119/720, 721, 712, 719; 340/573.1, 340/573.2, 573.3
See application file for complete search history.

(56) References Cited

U.S. PATENT DOCUMENTS

| | | | | |
|---|---|---|---|---|
| 6,067,018 | A * | 5/2000 | Skelton | A01K 11/008 119/721 |
| 6,232,880 | B1 * | 5/2001 | Anderson | A01K 15/023 119/421 |
| 6,271,757 | B1 * | 8/2001 | Touchton | A01K 15/02 119/721 |
| 6,310,553 | B1 * | 10/2001 | Dance | A01K 11/008 119/718 |

(Continued)

OTHER PUBLICATIONS

Astro Comm. ID and Alpha Channel Mapping Charts, 2012.
Garmin, Frequently Asked Question, Sep. 1, 2015.
Gundogsupply.Com, Better: More ID Codes, 2012.

*Primary Examiner* — Yvonne Abbott-Lewis
(74) *Attorney, Agent, or Firm* — Terrile, Cannatti, Chambers & Holland, LLP; Robert W. Holland

(57) ABSTRACT

A mobile telephone adapts to use as a gundog training tool by interfacing with a dog collar using a wireless communication device, such as a WWAN text or IP interface, a WLAN interface or a radio transceiver that couples to the mobile telephone and is accessible to a training application running on the mobile telephone. The dog collar includes a GPS receiver to provide position information to the mobile telephone and a shock device to provide training stimulus to the dog. A wireless headset interfaces with the mobile telephone to provide audible indications of position to an end user, such as a dog point and tone indicators of directions to the dog. A wireless handset interfaces with the mobile telephone to accept inputs for application to the collar, such as training stimulus.

20 Claims, 12 Drawing Sheets

(56) References Cited

U.S. PATENT DOCUMENTS

| | | | | |
|---|---|---|---|---|
| 6,437,727 B2* | 8/2002 | Lemelson | G01S 19/18 | 342/45 |
| 6,441,778 B1* | 8/2002 | Durst | G01S 5/0027 | 119/720 |
| 6,581,546 B1* | 6/2003 | Dalland | A01K 15/023 | 119/712 |
| 6,720,879 B2* | 4/2004 | Edwards | A01K 15/021 | 340/12.51 |
| 7,034,695 B2* | 4/2006 | Troxler | A01K 15/023 | 340/539.11 |
| 7,409,924 B2* | 8/2008 | Kates | A01K 15/02 | 119/719 |
| 7,486,181 B2* | 2/2009 | Olsen | B60R 25/1004 | 340/505 |
| 7,634,975 B2* | 12/2009 | Kates | A01K 15/021 | 119/712 |
| 7,864,057 B2* | 1/2011 | Milnes | A01K 15/023 | 119/721 |
| 8,126,410 B2* | 2/2012 | Alon | H01Q 9/0485 | 343/702 |
| 8,188,869 B2* | 5/2012 | Wangrud | A01K 11/008 | 340/539.13 |
| 8,438,999 B2* | 5/2013 | Hardi | A01K 15/021 | 119/718 |
| 8,457,595 B2* | 6/2013 | MacInnis | A61B 5/002 | 382/115 |
| 8,543,134 B2* | 9/2013 | Lopez | A01K 15/021 | 455/411 |
| 8,723,733 B2* | 5/2014 | Tran | H01Q 1/085 | 343/700 MS |
| 2004/0194714 A1* | 10/2004 | Lee | A01K 5/0114 | 119/54 |
| 2005/0000468 A1* | 1/2005 | Giunta | A01K 15/023 | 119/721 |
| 2005/0066912 A1* | 3/2005 | Korbitz | A01K 15/023 | 119/721 |
| 2005/0257752 A1* | 11/2005 | Langer | A01K 27/009 | 119/712 |
| 2007/0204804 A1* | 9/2007 | Swanson | A01K 15/023 | 119/721 |
| 2008/0036610 A1* | 2/2008 | Hokuf | A01K 11/008 | 340/573.3 |
| 2008/0159079 A1* | 7/2008 | Dir | A01K 97/125 | 367/139 |
| 2009/0071413 A1* | 3/2009 | Stapelfeld | A01K 15/023 | 119/712 |
| 2010/0045463 A1* | 2/2010 | Bradley | A01K 11/008 | 340/573.1 |
| 2012/0204811 A1* | 8/2012 | Ryan | A01K 15/021 | 119/720 |

* cited by examiner

MOBILE TELEPHONE DOG TRAINING TOOL AND METHOD

RELATED PATENT APPLICATION

This application is a continuation-in-part of U.S. patent application Ser. No. 13/901,934, filed on May 24, 3013, and entitled "Mobile Telephone Dog Training Tool And Method," by inventors James C. Bianchi and Robert W. Holland, which is a continuation-in-part of co-pending U.S. patent application Ser. No. 13/790,548, filed on Mar. 8, 2013 and entitled "Mobile Telephone Dog Training Tool And Method," by inventors James C. Bianchi and Robert W. Holland, both of which describe exemplary methods and systems and are incorporated by reference in their entirety.

BACKGROUND OF THE INVENTION

Field of the Invention

The present invention relates in general to the field of dog training, and more particularly to a mobile telephone dog training tool and method.

Description of the Related Art

Kali Bianchi recently completed an upland game bird grand slam. Kali is a French Brittany, *L'Epagneul Breton*. Her story is captured in "It's all about the Dog," published in the *Publication of the Club de l'Epagneul Breton of the United States*, Second Semester 2012, Issue 35. Kali never had formal training to speak of Kali, like most successful gun dogs, had good genetic cloth woven into a hardy hunting companion by her love of her master.

Although Kali lacks formal training credentials, she did learn some basic skills the hard way at the old-fashioned South Texas school of hard knocks. She learned to listen when told to come or she would get chased down. She learned to avoid rattlesnakes after getting whacked on the nose by a de-fanged rattler. She learned that skunks stink and that dogs that smell like skunk do not get love. She learned that when the boots and gun came out, she better pick up and go because good things usually happen. Kali learned where birds hide with time and freedom on her hunts to investigate promising cover. When the cover was taller than her short stature, a bell around her neck and swishing weeds generally indicated her whereabouts. During the excitement of a hunt, the absence of noise meant a point and Kali had learned to find her quarry.

Kali grew up on a South Texas ranch with lots of room to roam and learn about the outdoors. Many gun dog pups do not share Kali's good fortune. City dogs that do not get to experience the outdoors as Kali did often have difficulty adapting to hunting unless they receive some sort of formal training. Professional kennel trainers who train many dogs simply do not have time for old-fashioned, hands-off training like that Kali received. If, for example, a professional kennel trainer had to chase down every pup that failed to come when called, not much training would get done. Instead, professionals typically use training tools that help teach dogs what to do and what not to do.

One prominent dog training tool is the shock collar, which applies an electric shock to a dog's skin in response to a remote activation at a radio controller held by a trainer. After a dog learns the meaning of a command, like "come," application of a shock helps to ensure compliance when the dog hesitates or chooses not to listen. Some shock collars include or work with Global Position Satellite (GPS) receivers that aid a trainer in the field by letting the trainer track the dog's position on a display included with the radio controller. Examples of such systems include the GARMIN ASTRO and ALPHA systems. Some pet recovery systems use GPS to track lost dogs and report the position of the dog to an owner through a website or smartphone application, such as the SPOTLIGHT pet recovery system available from the American Kennel Club. After a dog learns verbal commands, advanced training usually involves the use of whistles to send commands over long distances. A good trainer who uses training tools in an appropriate manner can have a dog with smart genes trained to hunt in a month or two.

One difficulty with training dogs using shock collars is that dogs become "collar smart." If a dog figures out that he only gets shocked when a collar is on, he soon learns not to behave absent the collar. Worse, if the dog learns that the trainer has a shock collar but the master does not, the dog might decide to hear the trainer but not the master—who, incidentally, pays the trainer and buys the dog food. Most city dwellers burn years of kitchen passes when they buy an expensive hunting dog. If that dog won't hunt, the poor fellow has to do a load of dishes to pay for an expensive training collar. Ironically, once he gets the collar and puts it on the dog, he will probably not have to use it more than a couple of times to teach the dog to listen.

Simple old-fashioned training worked with Kali, but that bell around her neck has made her hard of hearing in her old age; as a result, the whistle too often goes unheard. Newfangled training tools work and help to make hunting more pleasurable for both the dog and his master. A hunter should not have to spend a lifetime of kitchen passes to have training tools—bells and whistles included—that work at home, work simply, and work well.

SUMMARY OF THE INVENTION

Therefore a need has arisen for a system, apparatus and method which adapt a mobile telephone to work as a dog training tool.

In accordance with the present invention, a system and method are provided which substantially reduce the disadvantages and problems associated with previous methods and systems for training a dog. A training application executing on a mobile computing platform, such as a mobile telephone or tablet computer, provides interactions with a training module deployed at a dog collar to perform training functions. Processing, display and communication resources of a mobile telephone are leveraged to provide a dog training system that is simple, reliable and not costly.

More specifically, in one embodiment, a mobile telephone processor executes a training application that coordinates training information and actions for training a dog, such as a pointer bird dog. The training application communicates with a dog collar using existing WWAN, WLAN and/or WPAN interfaces of the mobile telephone. The dog collar includes a GPS receiver that sends dog position information to the training application for presentation on the mobile telephone display, such as with a map of a hunt boundary that shows the relative position of the mobile telephone to the dog, to other dog collars and to other mobile telephones interfaced through an ad hoc, client/server or other type of WLAN supported by an 802.11 interface or by a mobile telephone circuit Internet interface transmitted through a mobile telephone service provider network. A shock device on the collar provides corrective stimulus to the dog based on a wireless signal issued from the mobile telephone. A headset and handset interface with the mobile telephone through a WPAN interface so that an end user may issue commands to the mobile telephone and listen to information from the mobile telephone in a hands-off mode. For instance, a wireless microphone accepts a verbal command "where dog?" to the training application running on the mobile telephone. The training application responds to the command by determining the dog position from the collar GPS retrieved through a text message sent by a WWAN mobile telephone circuit. Once the training application receives the dog's GPS position, the training application issues an audible "100 yards west" to the end user through a wireless headset Voice over Internet Protocol (VoIP) and videoconferencing supported through a WLAN or WWAN Internet interface allows a hunter to communicate verbally with a dog over an extended distance through a speaker of the collar and to see via a remote camera what the dog is pointing.

In one alternative embodiment, power consumption at a collar and radio transmission interference with communications of a collar are reduced by selectively suppressing or otherwise altering communication of position information from the collar. For instance, a training application executing on a mobile telephone assigns different frequencies and/or time slots to each of plural collars for communicating position information to an adapter or to a mobile telephone. A tunable transceiver of an adapter tunes radio frequencies for communicating with each of plural collars and synchronizes communications with a time slot assignment for each collar. Collars power down to a reduced-power consumption standby state, such as by powering down a collar transceiver, outside of a time slot assigned to the collar for transmission, thus preserving battery charge at the collar. Transmissions at a collar during time slots for the collar are selectively suppressed based upon changes in position of the collar relative to a previous transmission, or based on other predetermined factors. For instance, if a dog is on point then a collar suppresses position transmissions scheduled for one or more time slots while the dog's position remains relatively immobile, such as within 5 meters of the last position transmission. As another example, if a dog's velocity vector remains constant, the collar suppresses position transmissions since a virtual inertial navigation system on a mobile phone can track position based on a velocity vector determined from accelerations and orientation measured at the collar or determined from a history of GPS positions at plural times. An adapter listens during each time slot in case an update is transmitted from a collar and tracks reliability of position information by having position updates at minimal intervals, such as every minute. In one embodiment, a GPS receiver clock signal is used as a reference clock for collar, adapter and ad hoc 802.11(b, g or n) communications to maintain synchronous communications, reduce interference and improve the precision at which a collar and adapter can sleep, wake and communicate with each other. Alternatively, a collar wakes at times known to the adapter so that the adapter can transmit to the collar when position information is desired. In one example embodiment, Bluetooth (or other WPAN or alternatively WLAN) communications directly between a mobile telephone and a collar allow sleep of a UHF/VHF transceiver on the collar and on an adapter as long as Bluetooth pairing is maintained, such as anytime a collar comes within 10M or so of a paired mobile telephone.

The present invention provides a number of important technical advantages. One example of an important technical advantage is that the processing and communication capabilities of a smartphone are leveraged to enhance dog training with communications to a dog collar. Knowing the position of a dog and other hunters through mobile telephone communications enhances dog training and hunter safety. Hands-off control of dog activity through wireless peripherals of a smartphone allows a hunter to perform dog training activities without fumbling for a phone or other device. Leveraging smartphone capabilities to interact with a dog collar provides top-rate performance at an everyman cost controllable by an end user, who chooses whether to rely on basic mobile telephone WLAN 802.11 capabilities with minimal hardware costs or to rely on more expensive and expansive capabilities provided by interacting with a dog collar over a WWAN mobile telephone account or with an adapter that extends the range of direct radio communications by the mobile telephone to the dog collar.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Mobile telephones provide a dog training tool by interacting with a wireless communication module included on a collar on the dog. Depending upon the needs and desires of the dog's master, the mobile telephone provides short or long range training assistance, such as presentation of a GPS location of the dog relative to the master and stimulation to the dog from a shock collar or other training aid located on the collar. A training application running on the mobile telephone provides training functions that coordinate communications with one or more dog collars and with one or more other mobile telephones. For example, an ad hoc network within a hunting boundary is defined by plural training applications running on plural mobile telephones to provide enhanced coordination of dog training activities. The training application leverages capabilities generally included in mobile telephones so that advanced features are provided without costly specialized hardware. Mobile telephones, also known as cell phones or cellular phones, will work with a remote dog collar as envisioned herein by using existing wireless capabilities of the mobile telephone to communicate directly with a dog collar by a radio communication from the mobile phone directly to the dog collar and from the dog collar directly to the mobile phone. Generally, a mobile telephone has a form factor that provides a telephone handset, a touchscreen display to present information and accept inputs, and at least a WWAN transceiver to communicate wirelessly with a mobile telephone service provider network, such as with voice telephone communications, text message communications and data Internet communications like a web browser. In addition, a mobile telephone usually includes an 802.11 transceiver in the 2.4 and/or 5 GHz band to communicate through a wireless local area network (WLAN) and to communicate via short range wireless personal area network (WPAN) Bluetooth interfaces and a 60 GHz short range antenna for WPAN peripheral communications. Other types of mobile computing devices that include similar capabilities may also be used with the dog collar describe herein, such as tablet computing devices equipped with WWAN and WLAN capabilities.

Figure 1:
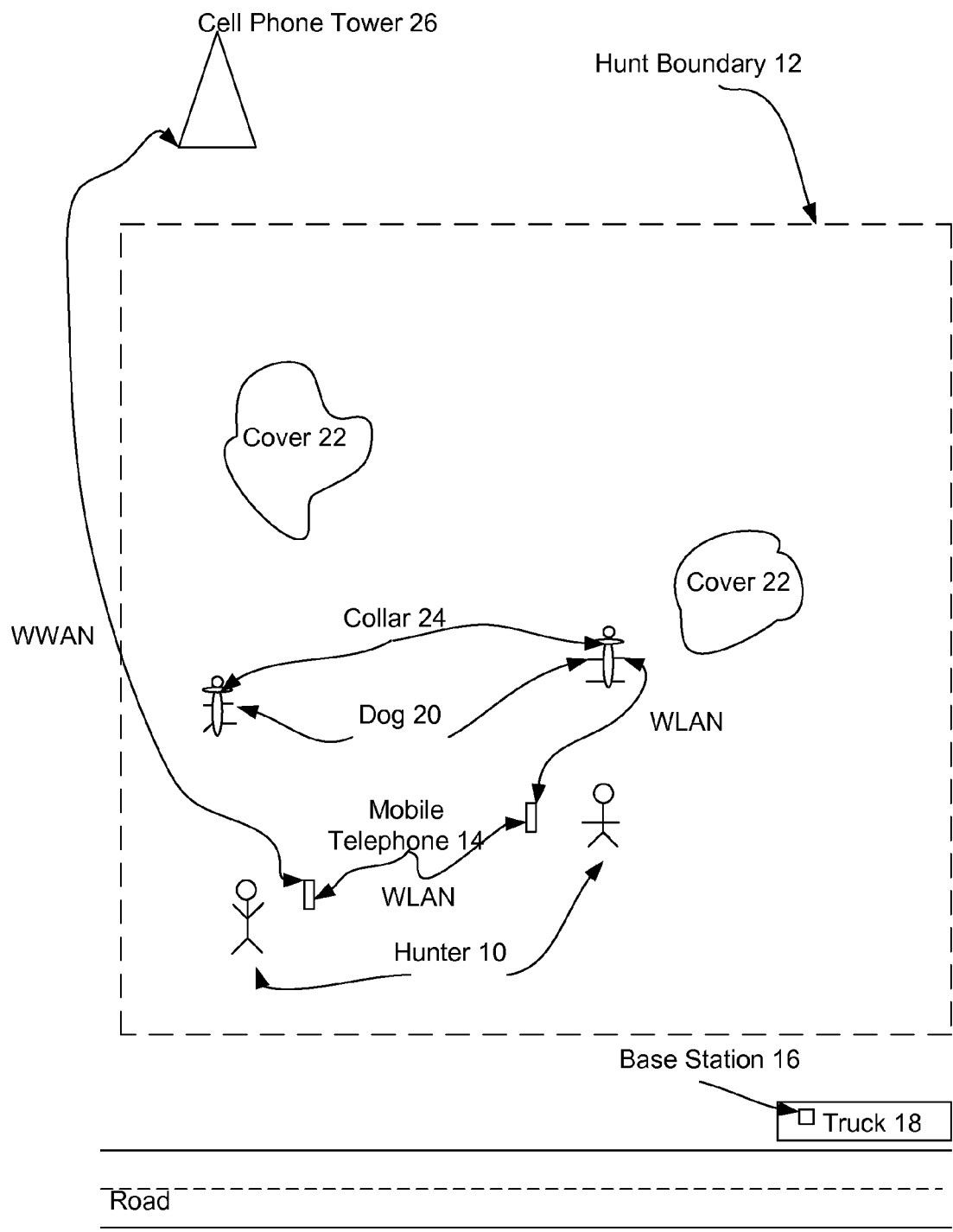
FIG. 1 depicts an example of a mobile telephone dog training system deployed in a hunting environment.

Referring now to FIG. 1, an example is depicted of a mobile telephone dog training system deployed in a hunting environment. Plural hunters 10 are deployed within a hunt boundary 12, each with a mobile telephone 14 that communicates through at least one wireless network. A base station 16 located at a truck 18 may be a mobile telephone or other computing device, such as a laptop or tablet computer, having an oversized antenna and amplified wireless signal to act as a relay or repeater station between mobile telephones 14 or between network communications, such as a WWAN and WLAN communication. Although the example embodiment uses mobile telephones 14 with hunters 10, in alternative embodiments, other computing devices may be used. Examples of mobile telephones 14 include APPLE iPhones, SAMSUNG GALAXY phones or other types of smartphones. Examples of base station 16 include APPLE iPADs, ANDROID-based tablets or other portable computer systems, such as clamshell laptop devices. In one example embodiment, hunt boundary 12 is the training area of a kennel so that base station 16 is a fixed desktop computer system.

One or more dogs 20 are deployed in hunting boundary 12, such as to hunt one or more areas of cover 22 for game birds like quail or pheasant. Each dog has a collar 24 that includes a communication module for communicating with mobile telephones 14 and each collar has a training module for providing a training function coordinated with mobile telephones 14. Communications between mobile telephones 14, base station 16 and collars 24 are supported in a number of different manners depending on the types of communication bands and protocols that are supported by mobile telephones 14 and collars 24. In one embodiment, a wireless local area network (WLAN) device, a wireless wide area network (WWAN) device and a wireless personal area network device (WPAN) are selectively included on each of mobile telephones 14 and collars 24 by assembly of one or more appropriately configured wireless communication modules to collar 24. Wireless communication coordinated through one or several of these wireless communication devices provides training applications running on mobile telephones 14 and base station 16 with training information for each other and collars 24, such as GPS positions, and with a medium for sending training commands, such as shock collar stimulus.

One example of wireless communications is communicating training information and commands between a collar 24 and a mobile telephone 14 through an IEEE 802.11(n) ad hoc or server/client WLAN interface. For instance, a training application on a mobile telephone 14 acts as a server and one or more collars 24 act as clients that send the server GPS position information, images from a camera aligned with a direction of a point for the dog 20 wearing the collar 24, a point alert from detection of lack of motion with an accelerometer in the collar 24, or other types of training information. The mobile telephone 14 server sends training commands to the one or more collars 24 that issue an electric shock or other stimulation at the collar, issue an oral command from a speaker on the collar, such as with a VoIP interface or with stored oral commands in a memory on the collar 24, or issue other types of commands. In an outdoor line-of-sight environment, an 802.11(n) WLAN interface has a range of approximately 250 m. If a collar 24 becomes out-of-range from one mobile telephone 14, then a second mobile telephone 14 that receives communications with the collar 24 and the other mobile telephone 14 can relay the training information and commands between the out-of-range collar and mobile telephone. Further, a WLAN interface between two or more mobile telephones 14 allows VoIP communication between the mobile telephones 14 so that hunters verbally communicate with each other. Although the example embodiment describes the use of 802.11(n) in the 5 GHz frequency range, in alternative embodiments, 802.11 (b) or (g) may be used with a possible increased range in the 2.4 GHz frequency range. In one example embodiment, a secured 802.11 network protected by a key or with HTTPS protocol may be used to avoid intrusion by others in the WLAN.

If a collar 24 becomes out of range for a WLAN interface with 802.11(n), WWAN communications may be used both with and without coordination by a cell phone tower 26. For instance, in remote areas mobile telephone service is sometimes not available or not reliable. In a situation where cell phone tower 26 is available, training applications on each mobile telephone 14 may use an Internet Protocol (IP) interface through a mobile telephone provider circuit to perform the same types of communications as are available through WLAN communications as described above. For instance, a VoIP, SKYPE or FACETIME communication will allow images and/or commands to be communicated between a collar 24 and a mobile telephone 20. As an alternative, text messages may be used to communicate information, such as with simple text, in an XML format or as a script executable by the training application. As an example, a collar 24 sends a text message with a GPS position at predetermined time intervals, such as every 10 seconds. As an alternative example, to save battery power at collar 24, a text message with a GPS position is sent based upon at least a predetermined change in position. For instance a text message is sent every 10 seconds unless the collars position has not changed by more than 10 feet, in which case no text message is sent until a position change of greater than 10 feet is detected or a greater time period has elapsed, such as another minute. This saves battery power during rest periods or when a dog is on point. Text messages may include attachments sent from a collar, such as an image captured by a camera associated with a collar. Text messages sent to a collar may include commands, such as a direction for the dog to turn, which is issued as an audible command by a speaker to have the dog 20 move in a desired direction. In one embodiment, a collar 24 intercepts IP packets or text messages sent from a mobile telephone by knowing the mobile telephone's network communication security codes so that the IP packet or text message need not transfer through a phone circuit at all. In alternative embodiments, other types of direct two-way communications may be accomplished between a mobile telephone 14 and a collar 24 with the WWAN or the WLAN frequency and protocol in the absence of mobile telephone service through a cell tower 26, such as through coordination with a mobile telephone service provider. One example is to re-program a WNIC of a mobile telephone to provide analog signals in the WWAN or WLAN frequencies to allow the mobile telephone to be used like a touch to talk service that mimics walkie talkie behavior or a remote control (RC) transceiver device. As one example, a WWAN type service may be provided with a WIMAX type of protocol, which provides approximately 1 mile of range.

A WPAN has a short range, such as that provided by 60 GHz frequency range protocols, Bluetooth or similar short range communication devices that support peripherals like wireless headsets for mobile telephones. In one example, a wireless headset is used by the training application running on the mobile telephone to issue audible information for a hunter or accept commands from a hunter. For instance, a lock tone is provided when the training application receives an indication from a collar that a dog as gone to point. The tone beeps at varying frequencies and with other alterations in sound to guide the hunter to the point, such as higher frequency tones when the mobile telephone is moving closer to the collar and lower frequency tones when the mobile telephone is moving further from the collar. A flush tone issues when the hunter reaches the location of the point as a warning to the hunter and as a warning to other hunters who have mobile telephones wirelessly interfaced with the hunter's mobile telephone or the dog's collar. As another example, a wireless handset coupled with an armband accepts inputs to buttons programmable by the hunter to accomplish training tasks, such as issuing stimulation from a shock device. As another example, a wireless camera mounted on top of the dog's head communicates images to a collar 24 so that the camera need not have a wired connection to the collar 24.

Hunt boundary 12 may be predefined before a hunt so that collars 24 will issue audible warnings if a dog attempts to leave the boundary, followed by stimulation. The boundaries and a map of the hunt area are stored on mobile telephone 14 ahead of time, such as from the Internet, in case phone service is not available to download a map during a hunt, such as at a remote location outside of the range of a mobile telephone service provider network. Hunt boundaries 12 may be programmed in memory of each collar 24 for an automated wireless fence around the hunt area enforced by logic at the collar or may be monitored automatically by a training application so that warnings and stimulations are sent through the WLAN or other communication medium as needed based upon a collar's position. In alternative embodiments, a base station 18 may be used to define a wireless fence at a hunter's home for use of the system when not hunting. For instance, the base station activates a "home" boundary loaded in memory of the collar so that logic on the collar can issue a stimulation if the position of the collar approaches, reaches or exceeds the home boundary. The boundary may be re-programmed as desired through a WLAN interface between the base station and collar. Breach of the boundary can also be programmed to notify the dog owner via mobile telephone that the escape has occurred and reduce the amount of time required to retrieve the wandering dog and the associated stress.

Figure 2:
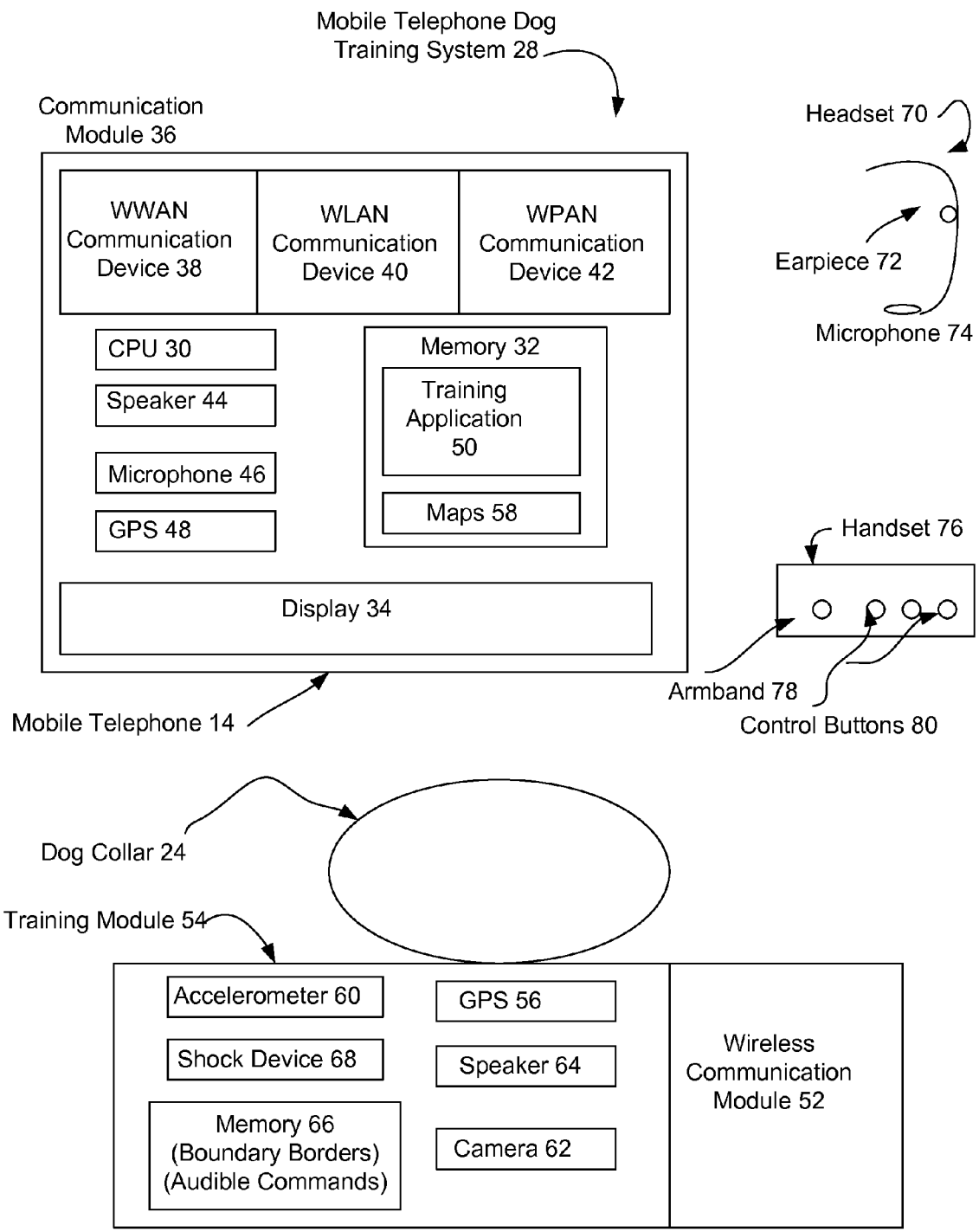
FIG. 2 depicts a block diagram of a mobile telephone dog training system.

Referring now to FIG. 2, a block diagram depicts a mobile telephone dog training system 28. Mobile telephone 14 is a smartphone having a CPU 30 and memory 32 that cooperate to execute instructions and present information as visual images at a touchscreen display 34. A communications module 36 cooperates with CPU 30 to perform smartphone communications. A WWAN communication device establishes communication with a WWAN, such as a mobile telephone service provider network that supports telephone circuit, text and Internet-type data interfaces. A WLAN communication device 40 establishes communication with a WLAN, such as an 802.11 network that supports Internet-type data interfaces. A WPAN communication device 42 establishes communication with a WPAN, such as Bluetooth or a 60 GHz band in a tri-band or WiGig network interface. Mobile telephone 14 includes a variety of other devices commonly found in smartphones, such as speaker 44 that outputs audible sounds, a microphone 46 that captures audible sounds and a GPS receiver 48 that determines a position of the device from GPS signals. In one alternative embodiment, a temperature sensor is included and proximate the housing to detect rapid changes in temperature, such as if a dog jumps into water, so that the event may be reported to an end user by radio.

Mobile telephone 14 adapts for use as a dog training system by executing instructions of a training application 50 stored in memory 32, which coordinates the use of hardware and software of mobile telephone 14 for performing dog training functions. For example, training application 50 coordinates communication with dog collar 24 through communication module 36. In the example embodiment, dog collar 24 has a removably coupled wireless communication module 52 that couples to a training module 54 so that an end user can select the type of communications that the mobile telephone will have with collar 24. For instance, wireless communication module 52 may have single or plural types of receivers or transceivers for supporting different types of communications selected by an end user with different frequency bands and communication protocols. In one example embodiment, wireless communication module 52 is an analog or digital receiver, transmitter or transceiver radio in the amateur UHF or VHF radio bands that communicates with an adapter for the mobile telephone 14 as set forth in FIG. 3. In another example embodiment, wireless communication module 52 is a WWAN receiver, transmitter or transceiver that communicates in the WWAN band and protocol of mobile telephone 14. In another example embodiment, wireless communication module 52 is a WLAN receiver, transmitter or transceiver that communicates in a WLAN band and protocol of mobile telephone 14. Various combinations of receivers and transmitters may be couple to training module 14 as desired by an end user, including plural separate communication modules 52 each of which provide a different type of communication. For example, in one embodiment a WWAN transmitter permits sending of text messages to mobile telephone 14 with GPS position information while a WLAN receiver permits reception of shock collar stimulus commands. As another example, a WWAN receiver obtains a time stamp from a cell tower also in use by mobile telephone 14 so that the timeliness of commands sent through a WLAN interface can be verified at collar 24—this prevents delayed application of a shock stimulus sent by a WLAN command, which could otherwise correct a dog when the dog is no longer performing an inappropriate action.

Training module 54 may include a variety of components that support training functions in cooperation with training application 50. The training functions may be in one contiguous housing assembled from several separate housings to allow selection by an end user of desired functions. One example component is a GPS receiver 56, which determines the position of collar 24 from a GPS signal and provides the position information to mobile telephone 14 through wireless communication module 52. Training application 50 presents the GPS position of collar 24 at display 34 on a map 58 along with the position of mobile telephone 14 so that the end user can determine the relative position of collar 24 by looking at display 34. Another example component is an accelerometer 60, which detects movement of collar 24 and issues a point alert in the event of a lack of movement under predetermined conditions, such as for a predetermined time period, so that wireless communication module 52 communicates a point alert to mobile telephone 14. Another example component is a camera 62, which captures still or moving images of an area relative to collar 24 where a dog points and provides the images to mobile telephone 14 through wireless communications module 52. In one example embodiment, camera 62 is coupled to a dog separately from collar 24 and communicates images to collar 24 with a WPAN so that wireless communications module 52 can forward the images to mobile telephone 14. Another example component is a speaker 64, which provides audible commands, such as either recorded voice or whistle tweets stored in memory of collar 24, that a dog wearing collar 24 can hear. Speaker 24 may present audible commands, either recorded voice or whistle tweets, provided through a VoIP interface with mobile telephone 24 and communicated through wireless communication module 52. For instance, an end user can speak a command audibly captured at mobile telephone 14 and played at speaker 64 or may press a button that issues an audible command from memory of mobile telephone 14. Alternatively, speaker 64 may present audible commands, either recorded voice or whistle tweets, in response to texts or other data that retrieves the commands from a memory 66, such as a turn or a whoa command. Another example component is a shock device 68 that applies a shock to a dog that is wearing collar 24 in response to a command received through wireless communication device 52. In alternative embodiments, alternative types of positive or negative reinforcements may be used, such as a clicker that issues clicks, a squirter that squirts a fluid, a vibrator that vibrates, etc.

Mobile telephone 14 includes WPAN communication that supports interactions with local peripheral devices to give a hunter hands-off interactions with collar 24. For example, a wireless headset 70 includes an earpiece 72 to play audible sounds in an end user's ears and a microphone 74 to capture commands by the hunter. Headset 70 interacts with a Bluetooth or other types of WPAN interfaces to communicate with mobile telephone 14. Another example is a wireless handset 76 that has an armband or other coupling device to make control buttons 80 accessible to a hunter in a convenient location distal mobile telephone 14. For instance, armband 78 couples to a hunter's wrist or gun to provide a collar selector that selects one of plural collars 24 at which to output a shock correction while the hunter's mobile telephone rests in a pocket or safe location. As another example, handset 76 keeps a body count of birds by species to help a hunter avoid violating a game bag limit. As the hunter gets a bird, the hunter hits a button associated with the species to allow training application 50 to track the number of the species taken. When a limit is reached, the hunter receives an audible warning in earpiece 72: "You have reached your pheasant bag limit, don't shoot!" Handset 76 can also be used to track other hunting information including location of points or flushes, water sources, or other geographic features which can be downloaded after the hunt for further analysis. In one example embodiment, the sound of a gun shot picked up by a microphone is recognized by training application 50 and automatically marked. At an appropriate time after the gun shot, the hunter is invited to speak a memo of what happened, which is save in association with the location. The inquiry may also include a request to update the body count. In one example embodiment, if the hunter responds to a body count inquiry with "shutup," no additions are made to the body count and the hunter is reminded that he should attend church on Sundays instead of hunt.

An example of the mobile telephone dog training system 28 in use follows, but is intended only as an example of how one embodiment of the system may be used. A hunter plans a hunt and stores the hunt boundary in a map 58 of memory 32 of mobile telephone 14 that the hunter retrieves from the Internet. The morning of the hunt, the hunter attaches first and second wireless communication modules 52 to collar 24 and puts the collar on his hunting dog. One wireless communication module 52 receives and transmits WWAN communications and the other receives and transmits 802.11(n) WLAN communications. The dog is released to hunt and disappears in cover. A moment later, accelerometer 60 detects that the dog has stopped moving and gone on point. The WLAN communication module 52 attempts to send a point alert to the hunter but fails to receive a response from training application 50. In response, the WWAN wireless communications module sends a text with the point alert to the hunter's telephone number. The hunter's mobile telephone 14 intercepts the text on its way to the cell tower and also receives the text message from the cell tower and, in response, issues a point alert through a WPAN to an ear piece 72 of wireless headset 70. The text includes the position of the point included from a GPS component 56 of collar 24 so that training application 50 provides the hunter with audible guidance towards the point position. As the hunter approaches, training application 50 initiates a video conference with camera 62 to capture an image of the point through WLAN communication device 40. If the point is on a skunk or snake, the hunter touches a control button 80 on a handset 76 secured to his wrist with an armband 78 to issue a shock from shock device 68. In one embodiment, the image includes infrared information to help distinguish varmints from birds. If the point is on a bird, the hunter issues a "WHOA" command from memory 66 or through a voice WLAN interface with speaker 64, such as a VoIP interface. As the hunter approaches the point position, a "flush" alert is issued to all mobile telephones interfaced with the WLAN so that all hunters are prepared. For instance, a training application running on each mobile phone monitors the dog position and the hunter position with WLAN communication and issues a flush alert when the hunter reaches a predetermined location proximate the dog. After the flush, training application 50 tracks the body count so that the hunter does not exceed his allowed bag limit.

Figure 3:
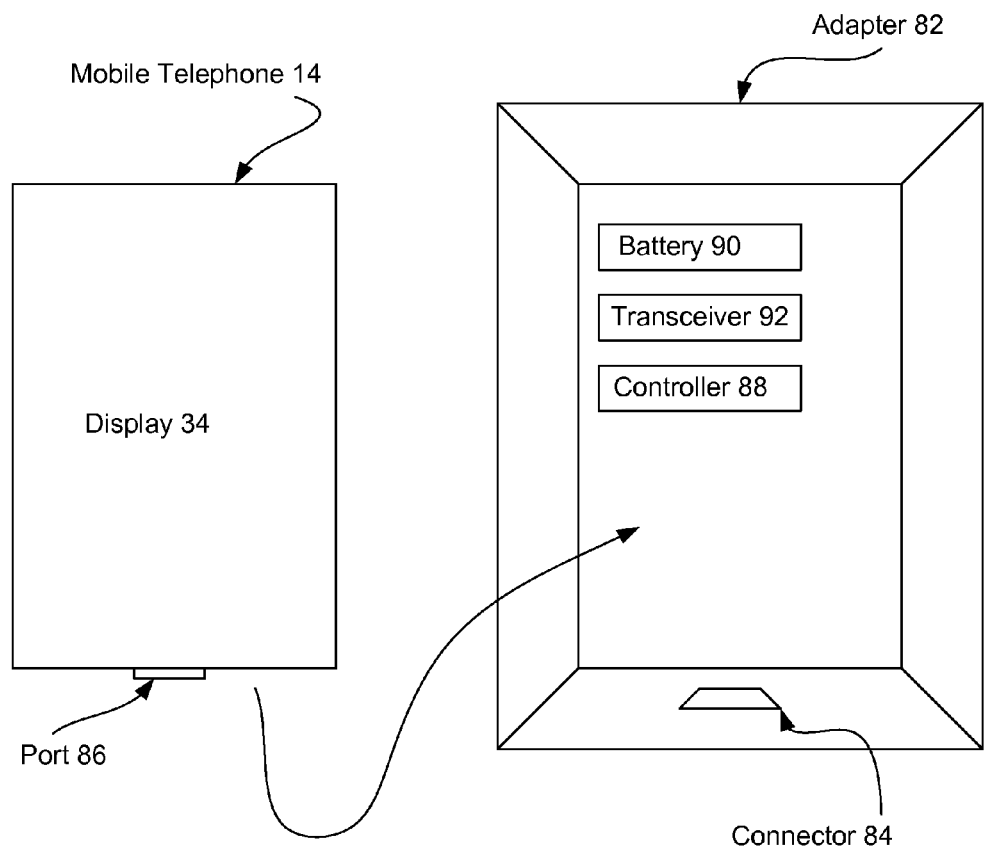
FIG. 3 depicts an adapter to accept a mobile telephone for interacting with a dog collar.

Referring now to FIG. 3, an adapter 82 is depicted to accept a mobile telephone 14 for interacting with a dog collar 24. Adapter 82 forms an opening to accept mobile telephone 14 with a connector 84 aligned to couple with a port 86 so that a controller 88 can interface with training application 50. Training application 50 provides information and instructions to controller 88 for sending and receiving communications with transceiver 92 of adapter 82, such as in a frequency band not available with the transceivers of mobile telephone 14. Adapter 82 includes a battery 90 to boost the charge life of mobile telephone 14 and a transceiver 92 to act as an intermediary between mobile telephone 14 and collar 24. Transceiver 92 offers improved radio communication range and reliability in a number of different ways depending on the user preference and the environment. For example, transceiver 92 provides increased range of communications from WLAN communications device 40 by amplifying or boosting WLAN signals. Alternatively, transceiver 92 communicates in a different radio band, such as a lower frequency band having greater range than the WLAN frequency band, with analog or digital signals to act as an intermediary communication medium when out of WLAN communication range. In one embodiment, training application 50 automatically detects the adapter and selects the radio band and protocol to use for communication based upon the range to collar 24. For instance, training application 50 uses a WLAN interface when the GPS position indicates collar 24 is within WLAN range and uses the intermediary frequency of adapter 82 when the GPS position indicates collar 24 is out of WLAN range. Adapter 82 provides a more robust system for hunters who desire to spend extra money on the extra feature; however, for many infrequent hunters who use collar 24 for yard work and occasional hunting trips, a WLAN range of 250M provides adequate range and reliability. In one embodiment, adapter 82 includes a waterproof protective case to hold mobile telephone 14 in a secure manner. In one embodiment, a larger sized adapter works for tablet type of devices that can include WWAN and WLAN capabilities. In another alternative embodiment, adapter 82 includes a WPAN so that it can boost the range of a mobile telephone 14 that is maintained separately and not inserted into adapter 82. For example, a hunter can strap adapter 82 on his back with an extended antenna for better range and the adapter communicates through a WPAN with a mobile telephone in the hunter's pocket as if the mobile telephone were coupled in adapter 82.

Figure 4:
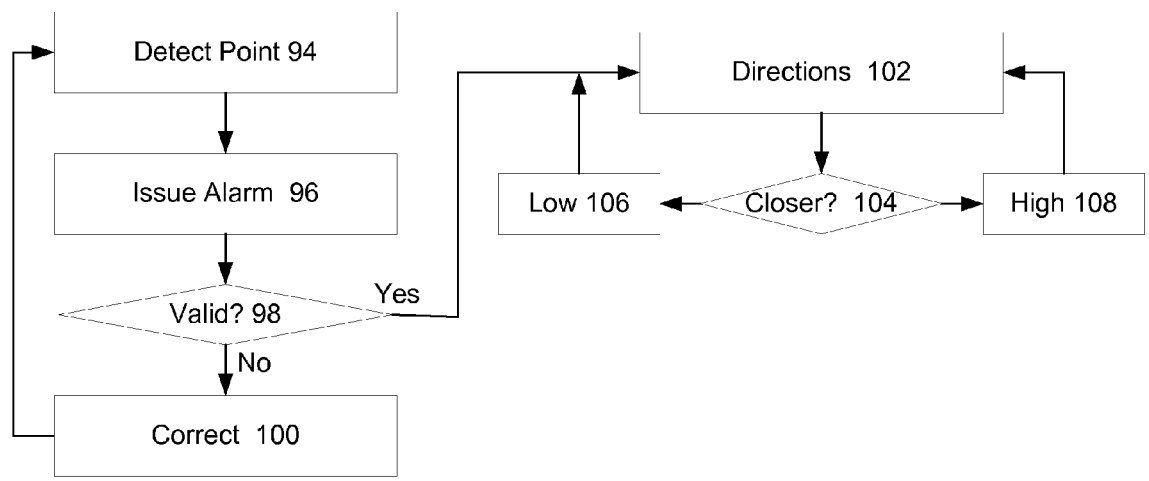
FIG. 4 depicts a flow diagram of a lock and tone process for guiding a hunter to a dog on point.

Referring now to FIG. 4, a flow diagram depicts a lock and tone process for guiding a hunter to a dog on point. The process begins at step 94 with detection of a point, such as with an accelerometer or lack of change of GPS position. At step 96, an audible point alarm is issued and an image of the point is presented at the mobile telephone display. In one embodiment, the alert and image is presented from the mobile telephone by a WPAN communication to glasses that the hunter is wearing along with a translucent map or a square or dot that indicates the location of collar 24 relative to the lens of the glasses. The hunter is thus able to see a map of the dog's position and an indication with a red dot or "target box" of where the hunter should look to see the dog through the glasses. At step 98, a determination is made of whether the point is a valid point on a game bird species or an invalid point, such as a point on a non-bird animal (a snake or skunk). If not a valid point, the process goes to step 100 to issue a correction, such as a shock stimulus, and returns to step 94. If a valid point at step 98, the process continues to step 102 to provide directions to the location of the point. If at step 104 a determination is made that mobile telephone position has moved further from the point position, the process continues to step 106 to issue a lower tone sound and then returns to step 102. If at step 104 a determination is made that the mobile telephone position has moved closer to the point position, the process continues to step 108 to issue a higher tone sound and then returns to step 102. Alternatively, directions at step 102 can present as computer generated audible directions, such as turn left or right, or flush in 10 yards.

Figure 5:
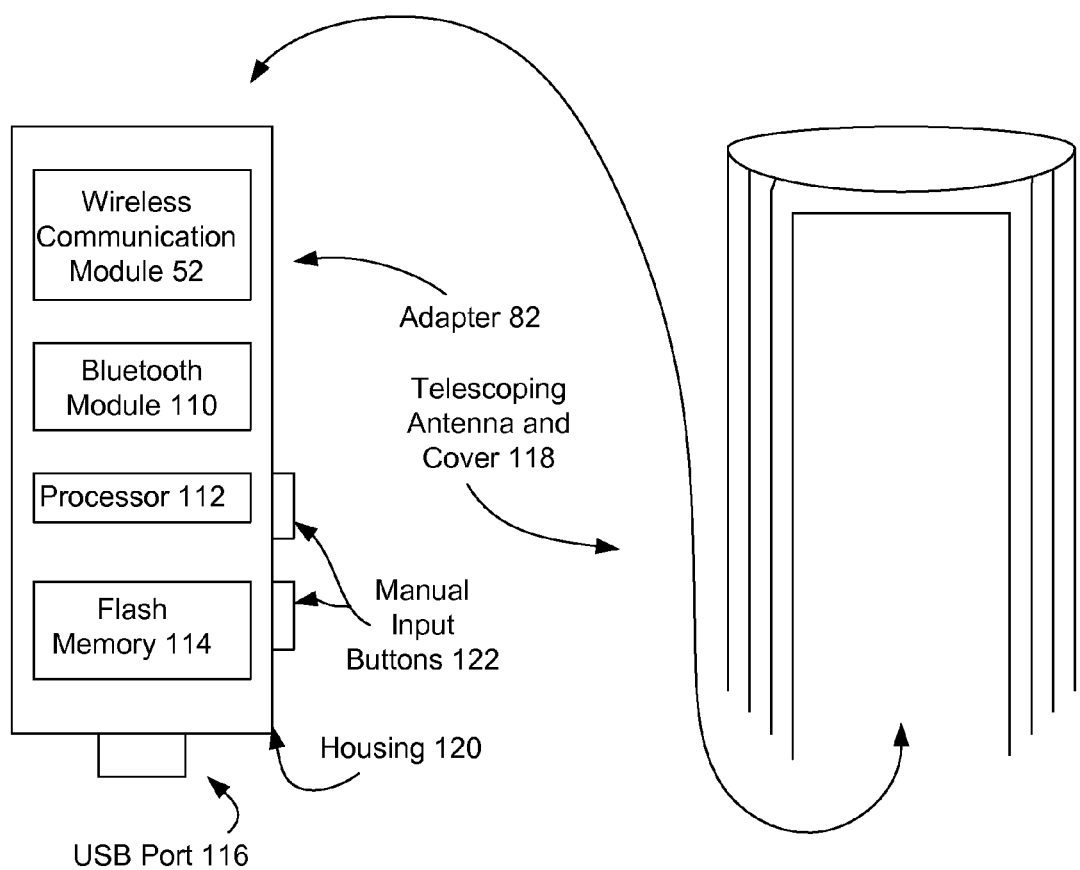
FIG. 5 depicts a side view of an example embodiment of an adapter for providing UHF and VHF frequencies and that interacts with a wireless telephone through a WPAN for relaying information to and from a dog collar.

Referring now to FIG. 5, a side view depicts an example embodiment of adapter 82 for providing UHF and VHF frequencies and that interacts with a wireless telephone 14 through a WPAN for relaying information to and from a dog collar 14. Wireless telephone 14 includes a training application as set forth above, such as to present a GPS position at a display that is provided from a collar 24 to an adapter 82 and then through a WPAN interface to mobile telephone 14. Adapter 82 includes a Bluetooth module 110 to provide WPAN functionality for communication with a Bluetooth transceiver of mobile telephone 14. A processor 112, such as a low power ARM integrated circuit, executes instructions stored in a flash memory 114 to perform adapter functions as set forth above and below. In one embodiment, ARM processor 112 is an embedded controller for Bluetooth module 110 that provides processing support for other functions as described herein. A USB port 116 interfaces with processor 112 to allow programming of instructions in memory 114, such as updates and patches; to retrieve information from memory 114 to an external device, such as a history of GPS positions tracked from collars 24; and to charge a battery of adapter 82. In the example embodiment, adapter 82 has the footprint of a pen or marker to fit in a pocket and a telescoping antenna 118 that slides over a housing 120 of adapter 82 to provide protection when adapter 82 is not in use. For instance, an end user carries adapter 82 in a shirt pocket like a pen until ready for use, and then extends telescoping antenna 118 and places adapter 82 in a hat band or other holder that maintains antenna 118 in an elevated position for improved radio reception and transmission range. In one embodiment, adapter 82 includes a GPS receiver of its own and provides an adapter position to mobile telephone 14 so that mobile telephone 14 can use the adapter position instead of or in combination with a GPS position determined by a GPS receiver in the mobile telephone.

Manual input buttons 122 are disposed on housing 120 of adapter 82 to accept touch inputs from an end user and report the touch inputs through Bluetooth module 110 to a mobile telephone 14 or dog collar 24, or through a wireless communication module 52 to a dog collar 24. Manual input buttons 122 are manually programmable by an end user to have varying functions that fit the user's desires based upon operating conditions of adapter 82, mobile telephone 14 and dog collar 24. For instance, an end user defines a close-in display presentation for when collars 24 are in close range, such as Bluetooth range, and a distal display presentation for when collars 24 are distant, such as outside of Bluetooth range. One of the manual input buttons 122 provides a hot-key that an end user touches to select the close-in or distal display presentation. As another example, an end user defines a first display presentation showing a compass and a full screen map with dog positions and a second display presentation with a half-screen map with dog positions and a half-screen with statistics, such as bag limits and kills for the day. The user prepares various display presentations at mobile telephone 14 and mobile telephone 14 provides the selected presentations when a Bluetooth communication from adapter 82 indicates an end user input at a button 122 to hot-toggle between display presentations. Alternatively, a selected presentation is made based upon a distance to collar 24, such as the compass and full screen map if collar 24 is outside of Bluetooth range and the half-screen with statistics if the collar is within Bluetooth range.

In one example embodiment, wireless communication module 52 disposed in adapter 82 includes a 900 MHz transceiver to provide moderate range of a mile or less and a 150 MHz transceiver to provide increase range of greater than a mile. In an alternative embodiment, a Silicon Labs EZRadio Si446X transceiver provides a selectable range of frequencies from 119 MHz to 1 GHz and transmits at a frequency set by mobile telephone 14 based in part upon distance to a dog collar 24. For instance, the transceiver steps between 900 MHz and 150 MHz based upon range to collar 24, signal strength from collar 24 and interference received from other transceivers. The use of either Bluetooth, 900 MHz, 150 MHz or other frequency signals to communicate with dog collar 24 is selected based upon logic running on processor 112 or logic running on mobile telephone 14 that provides control instructions through Bluetooth communications to processor 112. In one embodiment, an end user preselects frequencies at mobile telephone 14 for use by adapter 82 at various ranges so that plural systems operating in the same area have frequency ranges for use that are away from each other to avoid interference. For instance, one mobile telephone adapter 82 uses 850 MHz with range of less than one-half mile and 145 MHz with range of greater than one-half mile; another nearby mobile telephone phone adapter uses 900 MHz with range of less than one-half a mile and 150 MHz with range of greater than one-half a mile. A mobile telephone associated with each adapter communicates with each other in an ad hoc peer-to-peer 802.11(n) network to maintain frequency separation by defining for each other the frequency assigned for use by each mobile telephone's adapter. Alternatively, the mobile telephones 14 communicate with an ad hoc peer-to-peer network to establish the use of common frequencies in different time slots to avoid interference yet allow monitoring of each other's collars. In one embodiment, frequencies and time slots are determined beforehand and separately stored in each mobile telephone with coordination provided by a computer application. For example, an XML file stores time slots, frequencies, collar identifiers and map coordinates for plural mobile telephones 14 so that each mobile telephone can download and apply the information at the time of a hunt. For instance, a website stores plural XML files that end users can download to apply desired configurations, such as based on the number of mobile telephones and collars, to have a preconfigured hunt with assigned frequencies and time slots for each collar and mobile telephone. On the start of a hunt, the mobile telephones distribute the preconfigured assignments to the collars with Bluetooth communications.

Figure 6:
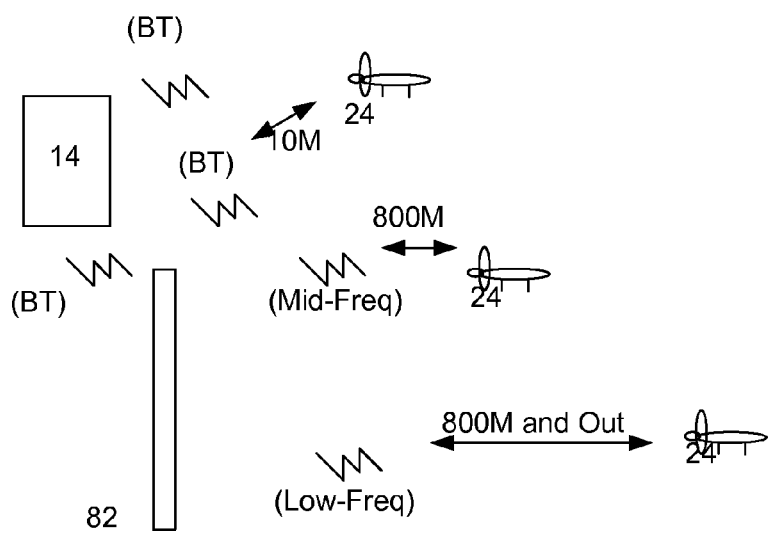
FIG. 6 depicts an example of a mobile telephone interacting with an adapter and a collar through plural radio frequencies, such as under management of a training application.

Referring now to FIG. 6, an example is depicted of a mobile telephone 14 interacting with an adapter 82 and a collar 24 through plural radio frequencies, such as under management of a training application as set forth above. Upon initial setup, mobile telephone 14 pairs with Bluetooth to both adapter 82 and dog collar 24. Mobile telephone 14 retrieves identifiers from adapter 82 and dog collar 24 so that the devices are automatically configured to communicate with each other using the wireless communication module 52, such as a packet header or other identifier to link adapter 82 with collar 24 and a frequency assignment for both devices to use in mid and low frequency ranges. In one alternative embodiment, initial configuration may be performed with a near field communication (NFC) device in mobile telephone 14, adapter 82 and collar 24. Initially, dog collar 24 provides GPS information to both adapter 82 and mobile telephone 14 with the Bluetooth pairing. Bluetooth communications consume minimal power and provide a range of around 10M so that during the initial phase of a hunt while the dogs are in close to mobile telephone 14, battery consumption of dog collars 24 is reduced relative to communications in other frequencies. In one alternative embodiment, GPS positions are not provided from collar 24 to mobile telephone 14 when Bluetooth pairing exists since the distance is small. In another embodiment, with the exception of an initial test to ensure operability of adapter 82, mobile telephone 14 commands adapter 82 through a Bluetooth communication to remain idle while mobile telephone 14 has Bluetooth pairing and communication with dog collar 24. Although Bluetooth is rated as having a range of 10M, the communications take place at 2.4 GHz, the same as a WLAN 802.11 (b or g) communication, and thus may work at greater effective ranges to provide GPS coordinates from dog collar 24 directly to mobile telephone 14 when a dog is hunting close in or when a hunter approaches a dog, such as a dog on point. Further, in one example embodiment, the Bluetooth signal may be amplified from dog collar 24 to increase Bluetooth range to mobile telephone 14, such as by providing a higher strength signal as distance increases based upon GPS coordinates analyzed at mobile telephone 14 or collar 24.

Once dog collar 24 reaches the limit of Bluetooth communication directly with mobile telephone 14, such as when a dog ranges out to start hunting, mobile telephone 14 initiates adapter 82 with a Bluetooth communication to adapter 82 so that a mid-frequency may be used to collar 24, such as communication with a 900 MHz radio. Adapter 82 initiates communication with dog collar 24 through the mid-frequency to retrieve GPS coordinates from dog collar 24 and provides the GPS coordinates to mobile telephone 14 through Bluetooth communications. If the signal strength of the mid-frequency transceiver communications between dog collar 24 and adapter 82 becomes weak or the GPS coordinates of collar 24 relative to adapter 82 indicate a range at the outside of the mid-frequency range, then mobile telephone 14 initiates the use of a low-frequency, such as 150 MHZ, by adapter 82 to dog collar 24. Adapter 82 sends a frequency change command in the mid-frequency range to dog collar 24 so that dog collar 24 can reset the frequency with a matching transceiver. As range decreases between adapter 82 and dog collar 24, such as when a hunter approaches a dog on point, mobile telephone 14 returns adapter 82 and collar 24 to the use of the mid-frequency followed by the Bluetooth communications for obtaining GPS coordinates from dog collar 24. An advantage of using a mid-frequency is that it tends to consume less power and communicate more information than a lower frequency. In addition, mid and low frequencies have different characteristics so that one may work better than the other under different operating conditions, such as caused by weather, water, terrain, cover, etc. . . . . . Further, in areas where a number of hunters are using mid or low frequencies, the availability of a second (or other tunable) frequency band will improve system reliability by decreasing interference.

Figure 7:
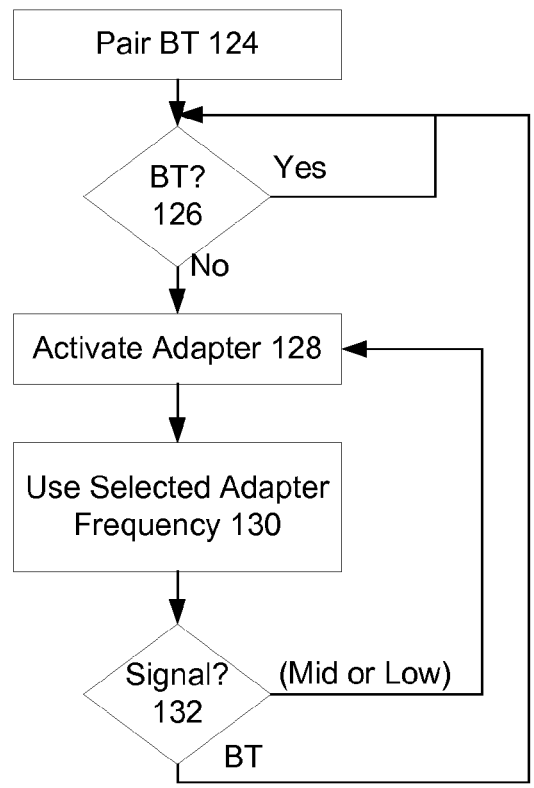
FIG. 7 depicts a flow diagram of a process for determining a frequency for communication with a dog collar.

Referring now to FIG. 7, a flow diagram depicts a process for determining a frequency for communication with a dog collar 24. For example, the process is provided by a training application executing on a mobile telephone 14 as set forth above. The process starts at step 124 with a pairing of Bluetooth transceivers located in mobile telephone 14, adapter 82 and collar 24. During pairing, configuration information is provided between the devices to enable communication of GPS position from collar 24 to adapter 82 and then to mobile telephone 14 for presentation at a display of mobile telephone 14. For example, an identifier for each device is provided to the other devices so that mobile telephone 14 can track GPS positions for the desired collar or collars 24. During pairing at step 124, a test may be performed to confirm operation of wireless communication module 52 for communication between adapter 82 and collar 24 to ensure that the desired frequencies are operational, such as frequencies selected for use by the hunter that day. Once pairing is complete, Bluetooth communications are maintained between mobile telephone 14, adapter 82 and collar 24 while Bluetooth-compatible ranges are maintained. Maintaining communication by Bluetooth through the early part of the hunt reduces power consumption by adapter 82 and allows automated activation of adapter 82 once pairing with collar 24 is lost or when Bluetooth communication of GPS coordinates indicates a threshold range, such as greater than 10M. Hunters thus do not have to manually place systems on and standby between hunts, and power is preserved by avoiding mid and low frequency transmissions when not necessary. At step 126, a determination is made whether Bluetooth pairing is maintained with dog collar 24 by adapter 82 or mobile telephone 14. If yes, the process returns to step 124 to continue monitoring GPS coordinates by Bluetooth communications. If no, the process continues to step 128 to activate adapter 82. In one example embodiment, transition from Bluetooth communication to adapter communication and back to Bluetooth communication may be aided by applying GPS coordinates of collar 24 compared to GPS coordinates of mobile telephone 14 to determine when Bluetooth range has reached a likely limit. When accurate range information is available so that adapter 82 uses wireless communication module 52 to communicate with dog collar 24, the Bluetooth transceiver or collar 24 may be idled to stop transmitting, thus saving additional power while the range between mobile telephone 14 and dog collar 24 is too great to communicate with Bluetooth. Once GPS coordinates of collar 24 and mobile telephone 14 indicate a Bluetooth compatible range as indicated by communications between adapter 82 and collar 24, Bluetooth transmissions may resume and transceiver 52 may be powered off.

At step 128, a determination is made of the frequency that adapter 82 will use to establish communications with dog collar 24. In one embodiment, the frequency is determined in mobile telephone 14 and sent by a Bluetooth communication to adapter 82. For example, upon initially leaving Bluetooth range, a mid-frequency is selected for adapter 82. As range between adapter 82 and collar 24 increases, a transition to a low-frequency is performed based upon a number of factors, including: distance determined from GPS coordinates, signal strength, vector (speed and direction) of collar relative to frequency range capabilities, interference from other radios, etc. . . . . Similarly, as range between adapter 82 and collar 24 decreases, a transition to a mid-frequency from a low frequency is performed. In one alternative embodiment, determination of the frequency for adapter 82 may be made with logic operating on adapter 82. For instance, when mutual communication between adapter 82 and collar 24 has not taken place for a predetermined time period, a recovery frequency is selected to attempt to establish mutual communication. In one embodiment, the timing of the recovery frequency attempt is based upon GPS clock signals so that power at collar 24 and adapter 82 is not needlessly wasted attempting to re-establish communications. At step 130, communications are performed at the determined frequency. At step 132, a determination is made of whether Bluetooth communications are re-established. If so, the process returns to step 126. If not, the process returns to step 128 to re-verify the frequency for use by adapter 82 to communicate with collar 24. When a new frequency is selected, the frequency is passed to collar 24 with the existing frequency so that communications are re-established on the new frequency.

Figure 8:
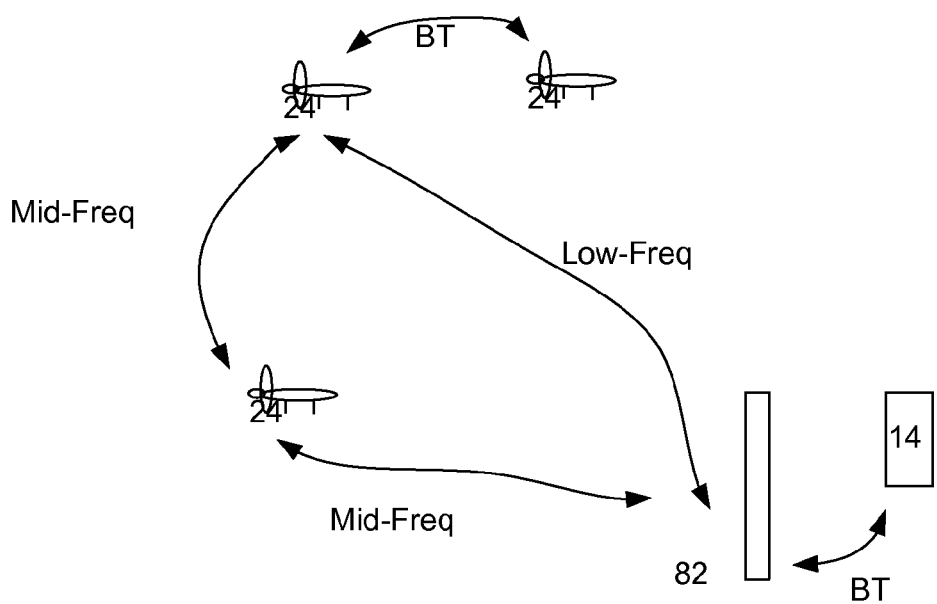
FIG. 8 depicts an example embodiment of a system that tracks multiple dog collars at one or more mobile telephones using one or more adapters.

Referring now to FIG. 8, an example embodiment is depicted of a system that tracks multiple dog collars 24 at one or more mobile telephones 14 using one or more adapters 82. Management of the multiple dog collars is performed, for example, by a training application running on one or more mobile telephones 14 as set forth above. In one example embodiment, the training application distributes logic and communication parameters to adapter 82 and collar 24. If one or more collars 24 are within Bluetooth range of each other, then the collar 24 having the most battery power is selected to use mid or low frequency communication with adapter 82 while the other collars 24 have their transceivers in sleep mode to save power. The selected collar 24 retrieves GPS positions from the dog collars within Bluetooth range and sends the GPS positions to adapter 82 so that only one collar 24 drains its battery with mid or low frequency communications. Alternatively, only one GPS position is sent from the selected dog collar along with the identifiers of all collars 24 that are in Bluetooth range so that mobile telephone 14 can track each identifier as in the same proximate location. In alternative embodiments, GPS positions and collar identifiers may be relayed using mid and/or low frequency transmissions between various collars 24 and adapters 82 so that each mobile telephone 14 can track all dog collars 24. In one example situation, if a dog is on point and another dog is honoring the point, GPS position information is sent from only one dog until flush is approached by a hunter, such as at issuance of a flush alert, at which time each collar 24 sends GPS information to protect the safety of each dog. For instance, if a hunter is positioned to shoot in the direction of a dog at flush, a warning may issue to an earpiece or with a phone ring to help prevent harm to the dog: "Don't shoot Jewel located ten meters north of your current position."

Figure 9:
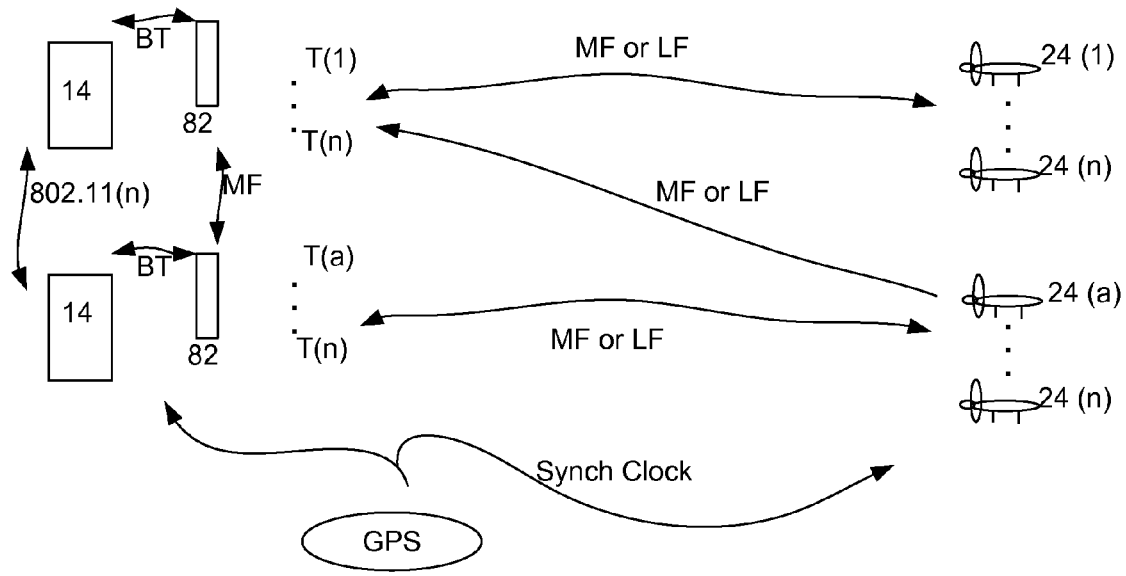
FIG. 9 depicts a variety of examples that provide improved battery life and reduced interference in hunting situations with multiple dogs and hunters.

Referring now to FIG. 9, a variety of examples are depicted that provide improved battery life and reduced radio interference in hunting situations with multiple dogs and hunters. For instance, a training application executing on a mobile telephone 14 as set forth above manages battery life and transmission interference by managing operation of adapter 82 and collar 24. Transmissions from collar 24 consume power from an internal battery so that more frequent transmissions result in shorter charge life for a given size battery. By reducing transmissions from collar 24, battery charge is conserved so that a smaller battery will support a collar for a given operating time. Further, reduced numbers of transmissions result in less bandwidth consumption so that less interference occurs in situations where multiple collars 24 and or adapters 82 are deployed. Less interference generally means that transmission attempts have a greater chance of success, thus further reducing the need for transmissions, such as repeated transmissions of the same data. To provide reduced transmissions, collar 24 and adapter 82 use logic to divide transmissions from each of plural collars 24 and adapters 82 into plural time slots. In one embodiment, a GPS clock is used as a reference point from which time slots are defined so that an internal clock on each device can precisely track its time slot for transmitting and receiving information relative to other devices. In addition, logic on collar 24 analyzes GPS position data and accelerometer data locally at collar 24 or in combination with mobile telephone 14 to limit transmissions where changes in position are relatively insubstantial. For instance, in an example embodiment, at periodic time slots, collar 24 only transmits if GPS data shows a change in position of greater than a minimum amount, such as 5M, or if a change in acceleration indicates a change in position relative to what the mobile telephone 14 monitoring collar 24 would expect over the time. Accurate position data is maintained at the mobile phone 14 by providing updates at minimum intervals, such as every minute. Accurate estimated positions are maintained at mobile phone 14 by applying accelerometer and orientation information (such as a velocity vector) provided from collar 24 (or alternatively GPS position data from collar 24 analyzed by mobile telephone 14 for change over time to estimate a velocity vector) to estimate positions with a virtual inertial navigation system (INS) between collar transmissions.

In the example embodiment depicted by FIG. 9, a first set of collars 24 labeled (1-n) is controlled by a first adapter 82 and first mobile telephone 14. A second set of collars 24 labeled (a-n) is controlled by a second adapter 82 and a second mobile telephone 14. The first and second mobile telephones 14 establish an ad hoc network with peer-to-peer communications using 802.11(n) to define time slot and frequency assignments for each adapter 82 to communicate with each set of collars 24. The first adapter 82 has a time slots t1 though tn with each time slot having an adequate length for a collar 24 to communicate GPS, accelerometer and/or other desired data. The time slots are defined relative to a GPS clock signal and tracked with an internal clock at each device, such as with a processor that controls a Bluetooth transceiver. The GPS clock signal also provides synchronization for communications between mobile telephones 14 in support of the ad hoc network. The time slots t1 through tn are sequentially defined so that adapter 82 activates its transceiver from sleep to listen across all time slots and then sleeps until the start of the next time slot period. Time slot periods may occur at regular intervals and/or at times defined relative to a GPS clock so that collars 24 know when to transmit to adapter 82. Collars 24 transmit in an assigned time slot if position updates have at least a minimum change or if a maximum time has elapsed since a previous transmission; otherwise, collars 24 keep their transceivers in a sleep mode to reduce power consumption. In one embodiment, collars 24 listen for a transmission from a collar in a previous time slot and initiate communication when the previous collar completes communication. In another embodiment, a collar 24 sleeps its transceiver 52 to reduce power consumption except during a time slot assigned to the collar. As an example each time slot t1 through tn lasts for one second with a one second idle time between each time slot until tn plus one second, then adapter 82 idles for 15 seconds from t1 based upon a GPS clock signal, after which adapter 82 awakens to repeat listening. Collar 24 remains idle up to five minutes unless a change in position or acceleration is detected, in which case a transmission is made during an assigned time slot. Adapter 82 has frequent "listening" times available to accept communication in a prompt manner when needed, such as at detection of a point, so that a collar 24 can communicate in a time slot when needed without an excessive delay. When a change in position or acceleration is detected, or five minutes has elapsed since the last collar transmission, collar 24 then transmits during a time slot assigned to it, such as based upon a reference to a GPS clock signal provided by a GPS transmission shared by a GPS receiver of collar 24 and mobile telephone 14. In one example embodiment, a collar 24 powers up its transceiver at predetermined "listen" times to receive position requests from an adapter 82. If adapter 82 requests a position update during a listening time, collar 24 responds with a position; otherwise, collar 24 saves power by avoiding unnecessary transmissions.

After the first mobile telephone 14 adapter 82 completes listening in its time slots, first adapter 82 may sleep its transceiver or, alternatively, may listen during the time slots assigned to the second adapter 82 so that first mobile telephone 14 can independently track collars 24 assigned to second mobile telephone 14 adapter 82. Similarly, second mobile telephone 14 can independently track collars 24 assigned to first mobile telephone 14. If mobile telephones 14 have too great a distance to communicate between each other with 802.11(n) or Bluetooth, then communications may take place between mobile telephones 14 through mid or low frequency transmission through adapters 82. If different frequencies are assigned to each adapter 82 for its collars 24, then an adapter 82 changes to the frequency of the other adapter 82 when listening for collars 24 in time slots managed by the other adapter 82. The overall effect of the use of time slots is that adapters 82 listen for transmissions from collars 24 at more frequent intervals than collars 24 transmit information, which may increase power consumption at adapters 82 relative to collars 24 but tends to decrease power consumption at collars 24 so that a smaller battery may be used at collar 24 to allow a smaller collar footprint than would be possible if collar 24 simply transmitted at regular intervals. Additional power savings may be achieved by adjusting the power used to transmit from collar 24. For instance, adapter 82 provides feedback to collar 24 of the signal strength received at adapter 82 and/or the distance between adapter 82 and collar 24. Collar 24 applies the feedback to adjust transmitter power settings, such as by reducing transmitter power when adapter 82 reports receiving a strong signal at a short distance or increasing transmitter power when the signal received by adapter 82 falls below a threshold.

Figure 10:
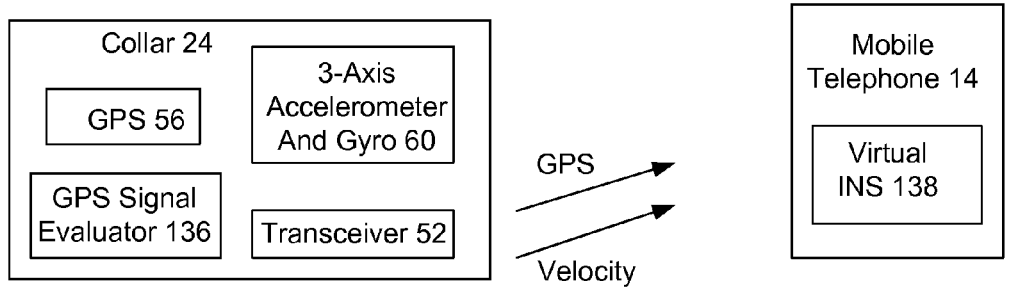
FIG. 10 depicts an example embodiment of a collar 24 that applies logic to selectively communicate position information in order to reduce the number of transmissions from collar 24 and thus save power.

Referring now to FIG. 10, an example embodiment depicts a collar 24 that applies logic to selectively communicate position information in order to reduce the number of transmissions from collar 24 and thus save power. For instance, a training application running on a mobile telephone provides logic to a collar 24 for execution on collar processor 112 to manage transmissions from collar 24 to an adapter 82. Accelerometer 60 includes gyroscopes to provide measurements of accelerations and the orientation of accelerations at collar 24, such as with a three axis MEMS-type device that has three gyroscopes aligned with three accelerometers. In one example embodiment, a lack of acceleration indicates a dog at point so that collar 24 makes less frequent position transmissions to save power since the collar's position does not change. If a lack of accelerations is replaced by new detected accelerations that indicate a point has ended, then transmissions are re-initiated to update mobile telephone 14 regarding position.

In one example embodiment, accelerometer 60 provides acceleration and orientation information to an integrator 134, which analyzes the acceleration and orientation information to determine a velocity vector at collar 24. Integrator 134 may execute as software on collar 24 or as a specialized hardware component interfaced with accelerometer 60. Integrator 134 may simplify generation of a velocity vector based upon the type of motion being tracked. For example, a running dog will have repeated pattern of motion that includes outlier accelerations when the overall running vector changes, such as with a turn or change in speed. Integrator 134 in one embodiment uses averaging of accelerations to identify outliers that allow generation of an average velocity vector for a given time period. In another example embodiment, when tracking motion of a dog or other moving animal, a constant acceleration of gravity alone indicates zero average velocity. In contrast, when tracking motion of an inanimate object, such as car, a constant acceleration of gravity alone may indicate a constant speed.

A GPS signal evaluator 136 analyzes the velocity vector (or alternatively the acceleration and orientation information itself) and GPS positions from GPS 56 to determine whether to transmit GPS or velocity vector (or raw acceleration/orientation information) information from collar 24 to adapter 82 or to maintain a sleep mode with the collar transceiver. If, for instance, a velocity vector associated with collar 24 remains relatively constant, then less frequent position transmissions are provided to mobile telephone 14 since mobile telephone 14 can apply the velocity vector to estimate collar position with relative accuracy. The velocity vector used by mobile telephone 14 to estimate position may be provided from collar 24, may be determined at mobile telephone 14 from acceleration and orientation information provided from collar 24, or may be estimated by mobile telephone 14 from GPS positions provided by collar 24 over time. If, in contrast, a velocity vector associated with collar 24 changes by a predetermined amount, then more frequent position transmissions are provided to mobile telephone 14, including updated velocity vector information. As another example, if a GPS signal becomes weak so that GPS position is unreliable, such as may happen under dense foliage, GPS signal evaluator withholds GPS position information and sends more frequent velocity vector (or alternatively acceleration and orientation information) to mobile telephone 14 so that a virtual inertial navigation system (INS) 138 executing on mobile telephone 14 can track collar position with INS logic based upon accelerometer and gyroscope orientation measurements taken at collar 24 and transmitted to mobile telephone 14, such as in the form of a velocity vector. In one embodiment, GPS signal evaluator 136 applies an end user accuracy/power preference setting to determine how often to transmit position information; a higher accuracy preference with more frequent transmissions will consume increased battery charge resulting in reduced battery life. In another embodiment, GPS signal evaluator 136 attempts to detect a GPS jamming signal. A GPS jamming signal may be used by individuals who wish to disable GPS position data, such as to steal a dog or another item monitored by a GPS receiver. If a GPS jamming signal is detected, then a virtual INS position may replace the GPS position, such as a virtual INS position derived from acceleration and gyroscope data detect at the GPS receiver. The virtual INS position may be locally determined by a processor couple to the GPS receiver or alternatively may be determined at a distal location by sending raw acceleration and gyroscope data to a distal processor, such as the processor of a smartphone as described herein.

Figure 11:
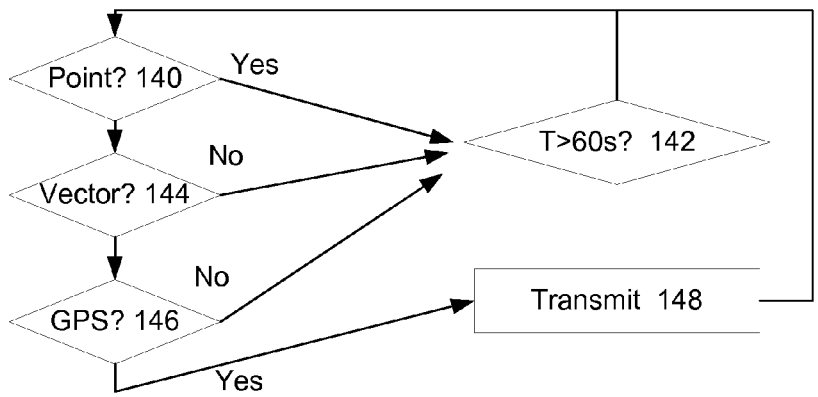
FIG. 11 depicts a flow chart of one example of logic for determining when to communicate position information from a collar.

Referring now to FIG. 11, a flow chart depicts one example of logic for determining when to communicate position information from a collar 24. The process starts at step 140 with a determination of whether the collar 24 is on point or otherwise immobile. If yes, a point alert issues upon initial determination of the point and the process continues to step 142 to determine if a minute has passed since the last transmission from collar 24. If a minute has not passed, the process returns to step 140. If a minute has passed at step 142, then a position transmission is made at step 148 and the process returns to step 140. If the point determination at step 140 is no, the process continues to step 144 to determine if a velocity vector change has occurred based upon sensed accelerations and orientations. If a velocity vector change has not occurred, the process continues to step 142 to determine the last transmission as set forth above. If a velocity vector change has occurred, the process continues to step 146 to determine if a measured GPS position has changed by greater than a predetermined amount, such as 10M. If not, the process continues to step 142 to determine whether to make a transmission as set forth above. If yes, the process continues to step 148 to make a transmission. In one example embodiment, transmissions are made during defined time slots during which adapter 82 is awake to receive the transmissions, such as every 10 seconds based upon a GPS clock reference that improves accuracy in defining the time slot. In one alternative embodiment detection of a vector change can initiate a transmission at step 148 even where GPS position has not changed beyond a minimum amount. This provides positive updates based upon activity associated with the dog that may indicate a chase or an inaccurate GPS position signal. In one alternative embodiment, position information is transmitted from collar 24 based upon a change in position of greater than a threshold amount from the last transmitted position, such as every time the collar moves 10M or greater from a last transmitted position. This updates positions when positions change and saves power by avoiding transmissions from a collar 24 when a position has not changed enough to warrant an update to a training application.

Figure 12:
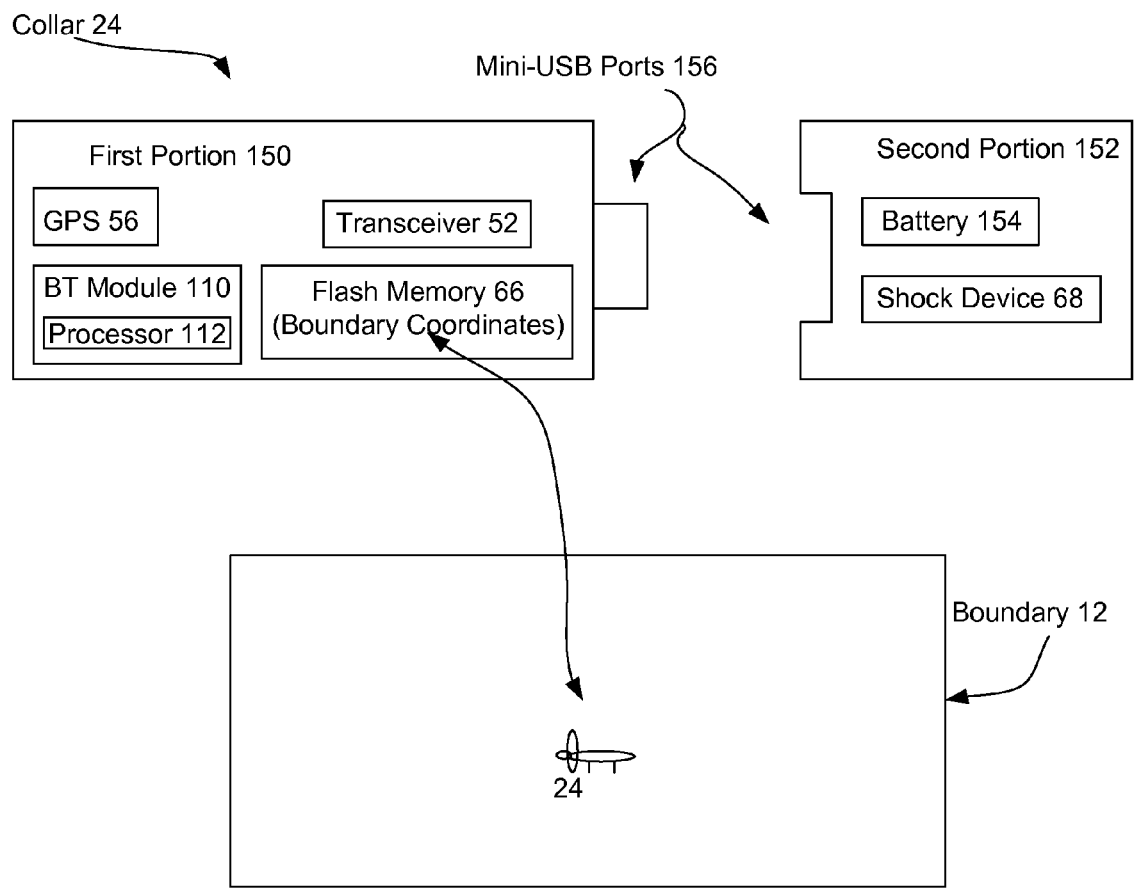
FIG. 12 depicts one example of a modular collar adapted for use with a shock device 68, such as to enforce a GPS fence boundary.

FIG. 12 depicts one example of a modular collar 24 adapted for use with a shock device 68, such as to enforce a GPS fence boundary 12. Collar 24 has a first portion 150 that contains processing components for managing position data and performing radio transmissions, and a second portion 152 for providing power with a battery 154. In the example embodiment, a shock device is included with the second portion 152, however, in alternative embodiments second portion 152 provides a removable battery 154 without a shock device that can have a smaller footprint where power is only needed for first portion 150 and not needed for a shock device 68. First portion 150 interfaces with second portion 152 with opposing mini-USB ports 156 that allow battery 154 to power first portion 152 and allow a processor of first portion 152 to control shock device 68. Using USB ports 156 for interfacing first portion 152 with second portion 154 conveniently allows logic and charging interfaces with each portion by USB devices, such as a laptop computer that charges battery 154 and accesses flash memory 66 of first portion 150. First portion 152 includes a Bluetooth module 110 and ARM processor 112 that controls Bluetooth operations. A wireless communication module 52 interfaces with processor 112 to communicate with adapter 82 using mid and/or low frequency signals as described above. An external computer interfaced through a USB port 156 of first portion 150 can store coordinates of boundary 12 for access by processor 112 so that processor 112 can issue a shock by shock device 68 if collar 24 approaches a boundary. Alternatively, Bluetooth communications from an external computer can store the boundary coordinates in flash memory 66.

Advantageously, collar 24 maintains minimal power consumption while monitoring position with GPS 56 because no transmissions are made by wireless communication module 52 as long as collar 24 remains within the GPS coordinates boundary 12 stored in flash memory 66. If collar 24 approaches a boundary 12 defined by GPS coordinates in flash memory 66, then shock device 68 issues a stimulation to motivate the dog to return to the boundary. In one embodiment, a voice command issues from collar 12, such as a whoa command stored in flash memory 66 and played at a speaker of collar 12, so that the dog stops moving. Stimulation issues at shock device 68 if the dog fails to whoa. Along with the whoa command, the processor 112 initiates communication through wireless communication module 52 to issue a warning to an end user that the dog has approached and/or breached boundary 12. If collar 24 is within extended Bluetooth range, the warning may issue with a Bluetooth or an 802.11(b, g or n) signal to a computer device or mobile telephone 14 of the end user. Alternatively, wireless communication module 52 remains powered down until a boundary 12 is approached or breached and then transmits through low or mid frequency ranges as described above to allow an end user to locate collar 24 with the GPS position received by an adapter 82 and forwarded to a mobile telephone 14 or other computing device. In one embodiment, adapter 82 stores GPS positions and acceleration information so that an end user can recall at a later time the direction taken by collar 24. In another embodiment, once a collar 24 breaches a boundary 12, a recovery signal with the GPS position is issued at regular time intervals from wireless communication module 52 of collar 24 based upon a GPS time signal or other clock to synchronize transmission of signals from collar 24 with reception of signals by adapter 82. For instance, collar 24 issues a signal at 15 second intervals on four different frequencies in sequential order each minute to ensure that interference does not impede signal transmission. Adapter 82 knows the frequency to listen to on each 15 second interval based upon a GPS clock signal available to both adapter 82 and collar 24 that ensures synchronization with an internal clock, such as a clock supported by processor 112. In an alternative embodiment, collar 24 listens at the 15 second intervals without transmitting unless a transmission is detected from adapter 82 that commands a transmission of position information from collar 24; this allows collar 24 to preserve battery charge for a longer time period. Other power savings techniques may be used at collar 24 as described above, such as only transmitting a position if the position changes by more than a threshold from the most recent position transmitted by collar 24 and received by an adapter 82, such as by sending a confirmation of position reception from adapter 82 to collar 24. In summary, collar 24 maintains a low power mode while a dog remains in boundary 12 by executing instructions on processor 112 without communication with external devices and then initiates a transceiver when a dog breaches the boundary 12 to provide a warning and position information to an adapter 82 for presentation at a mobile telephone 14 or other computing device. An end user is able to monitor a dog's position for lengthy time periods with minimal battery discharge by avoiding communications until position information is needed because the dog has left a proscribed area.

In various embodiments, various portions of the collar, adapter, training application and virtual INS may be used in different ways, alone and in combination with each other. As an example, although collar 24 is presented in the context of a dog collar, similar use is made with monitoring of children, such as by attaching a collar 24 to a child as a wrist bracelet, ankle bracelet or necklace. A parent can set parameters to issue warnings, for example, if a child leaves a park, school, shopping center, athletic event, etc. . . . A parent can monitor for sudden accelerations that might indicate an injury to a child, or a velocity vector towards a busy street, and obtain immediate oral warnings in an earpiece having a Bluetooth interface with a mobile telephone 14. For instance, a high g-force detected by an accelerometer triggers an "injury" alert for the parent similar to the point alert for a dog. Monitoring by adapter 82 provides an inexpensive alternative to tracking devices that require cell phone service. A virtual INS operating on a mobile telephone based upon acceleration and orientation information provided from a collar allows a parent to monitor a child's position during indoor activities where GPS reception is sometimes intermittent. Power savings techniques set forth above allow a collar 24 to have a small footprint that a child can wear a collar with relative comfort and minimal interference with the child's activities. Further, a speaker and microphone on the collar can provide the parent with immediate voice access and the ability to listen to the child's environment when appropriate by interfacing through adapter 82 or an ad hoc peer-to-peer communication with 802.11(b, g or n). As another example, adapter 82 interfaces with any device that receives WPAN communications, such as Bluetooth, including laptops, tablets or desktop systems. For example, a parent wearing Google Glass obtains a GPS position of a collar 24 from adapter 82 with a Bluetooth communication and can present at the glass a box over the position of the child so the parent can quickly obtain a visual of the child. Virtual INS may track inanimate objects, such as packages or items subject to theft and can issue a theft alert in the event of a sudden acceleration. Mobile telephone 14 may have adapter 82 integrated within its housing to provide a mobile telephone 14 with integrated adapter functionality. Alternatively, mobile telephone 14 may alter operation of existing hardware, such as firmware that executes 802.11(b, g or n) or Bluetooth communication, to provide communications at various tunable frequencies in the place of an adapter 82. Other alterations to the described dog collar, adapter, mobile telephone embodiment are contemplated as desired to track items as desired by an end user.

Figure 13:
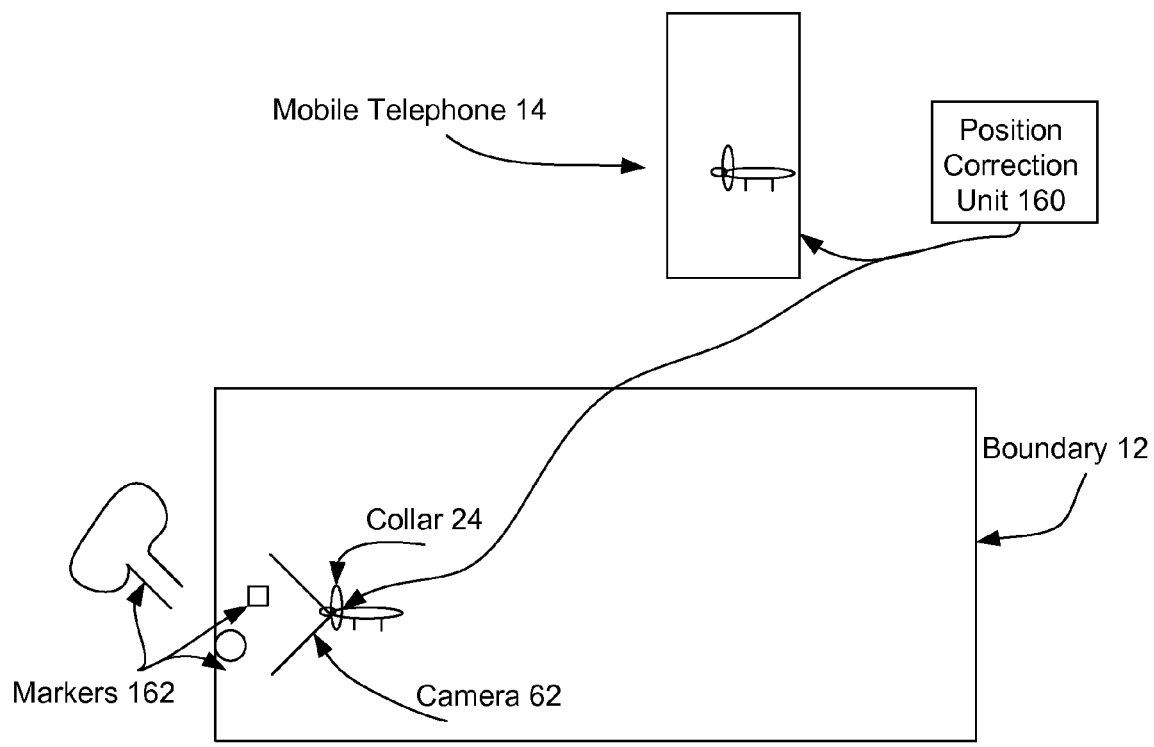
FIG. 13 depicts one example of a collar adapted to correct GPS position within a boundary by reference to images of features within the boundary taken by a camera in the collar.

Referring now to FIG. 13, an example is depicted of a collar 24 adapted to correct GPS position within a boundary by reference to images of features within the boundary taken by a camera 62 in the collar. Although a good quality GPS receiver will provide reasonably accurate positions, variances of several meters between measured and actual positions fall within normal operating specifications, and accuracy often depends of reception qualities that are difficult to predict in advance. If a shock device on collar 24 is used to maintain dog 20 within a boundary based upon detected GPS position, dog 20 may receive shocks even at positions that are within the boundary due to errors in the measured GPS position. To improve the accuracy of GPS measurements, camera 62 captures an image of the area in front of dog 20 and a position correction unit 160 compares the image with expected features based upon the detected GPS position and corrects the GPS position to have consistency with the images captured by camera 62. In some instances, a marker 162 is placed at known positions to provide a correction for the GPS position detected by the GPS receiver. Marker 162 may have a text or barcode presented to be read by camera 62 so that analysis of the image provides the GPS position by reading the text with an optical code reader or the barcode with a barcode reader. Further, marker 162 may include markings that aid evaluation of an image of marker 162 to determine how far from marker 162 the image was taken. As an alternative, the user may walk collar 24 with the camera 62 aligned to capture images at the boundary for later reference. Another alternative embodiment compares images captured by camera 62 with satellite images of landmarks proximate to the boundary to aid detection of appropriate markers, such as rocks, fences, water, roads, trees, etc. . . . . Camera 62 may be a depth camera that measures distance to objects or separate cameras at different locations that measure relative angles to resolve distance to objects. Although position correction unit 160 is depicted as included in mobile telephone 14 so that images sent from the collar are analyzed at mobile telephone 14, in alternative embodiments position correction unit 160 may run on a processor within collar 24 to analyze images at collar 24 and may use a variety of other image recognition methods to resolve objects found and expected in the boundary as set forth above.

Figure 14:
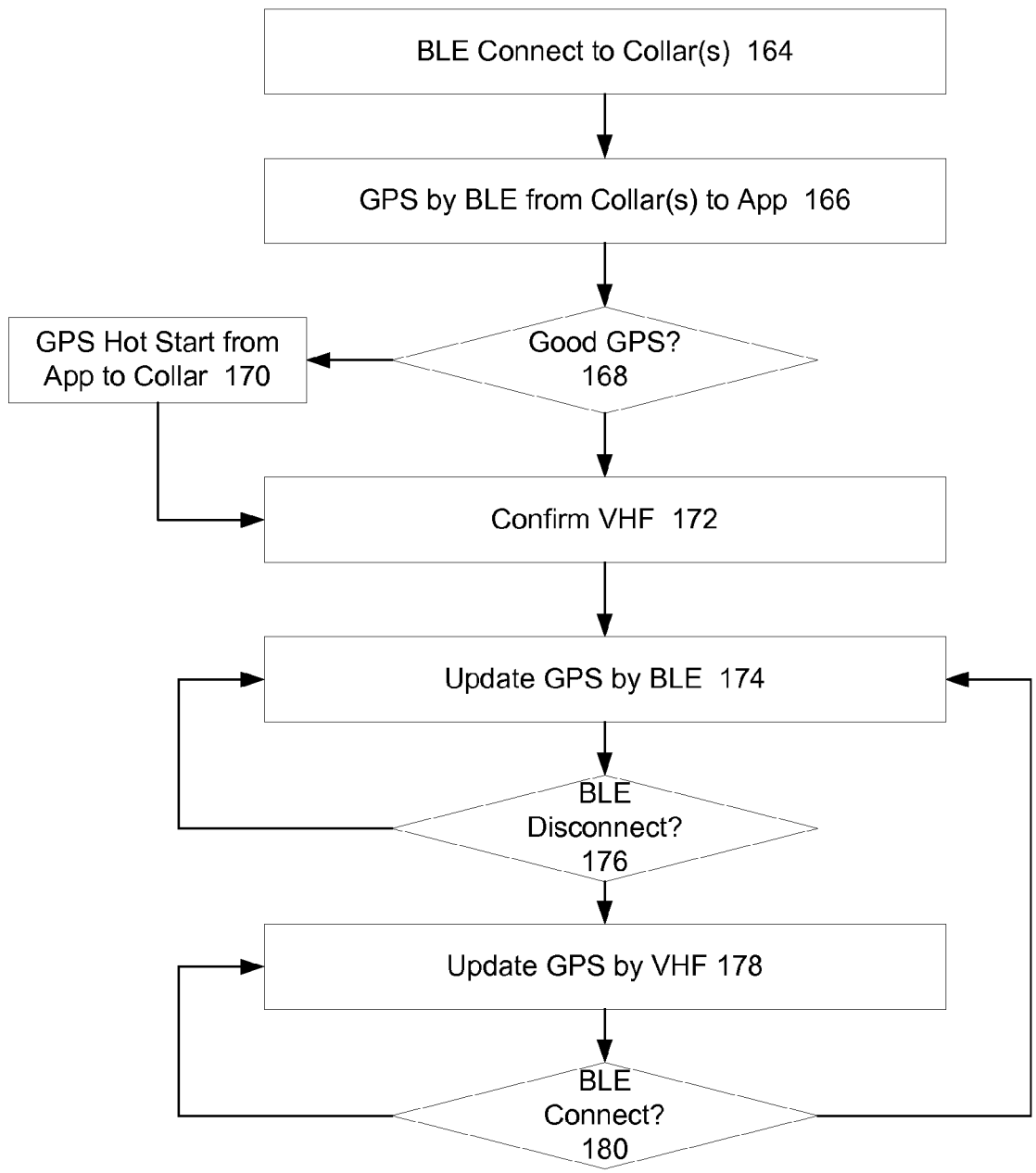
FIG. 14 depicts a flow diagram of an exemplary method for tracking GPS positions from a collar with WPAN and VHF radio communications to conserve battery power.

Referring now to FIG. 14, a flow diagram depicts an exemplary method for tracking GPS positions from a collar with WPAN and VHF radio communications to conserve battery power. In the example embodiment depicted by FIG. 14, the WPAN is a Bluetooth Low Energy (BLE) interface between an adapter and a mobile telephone or tablet device and one or more collars and the mobile telephone or tablet device. BLE provides a low power consumption wireless interface by establishing intermittent connections at timed intervals in the 2.4 GHz band. Although BLE maintains low power consumption, it also provides limited range of between 10 and 30 M. In contrast, VHF communications in the 154 MHz band provides an extended line of sight range with transmissions in the unlicensed public bands allowed at up to 2 W. The process depicted by FIG. 14 is executed as logic on the mobile telephone, adapter and/or collar device to take advantage of reduced power consumption available with WPAN communications.

The process begins at step 164 with a BLE connection between the collar and the mobile telephone. In an alternative embodiment, step 164 may be accomplished without a formal connection, such as by broadcasting position information from the collar as an advertisement that the mobile telephone does not connect with. Alternatively, collar BLE communications may be monitored by the adapter with a connection or by monitoring collar broadcasts and then forwarded from the adapter to the mobile telephone by BLE. In one embodiment, communication of GPS position by BLE is sent in a broadcast by the collar using truncated GPS values as described herein. Truncating the degrees and at least some of the minute values allows both latitude and longitude values to fit in a single BLE packet. Truncated GPS values may be used by an application on the mobile telephone with a preamble sent when higher degree and minute values change or under the assumption that the collar is within BLE range so that collar values are close to mobile telephone GPS values, as set forth below. At step 166, after a BLE connection is initially established between the collar and the mobile telephone, GPS position is sent from the collar to the mobile telephone. At step 170, a determination is made of whether the collar GPS position is valid and, if not, the process continues to step 170 to send hot start information from the mobile telephone application to the collar to aid in a more rapid GPS position acquisition. For example, the mobile telephone provides its GPS position, GPS clock and GPS ephemeral data to the collar receiver. In one embodiment, the hot start information is retrieved from a website service, such as that provided by Ublox. In an alternative embodiment, the hot start information is extracted from a GPS receiver running on the mobile telephone. Such an extraction allows hot starts where the mobile telephone does not have an Internet interface to obtain ephemeral data from a web service.

At step 172, once the collar has a good GPS position, a test VHF transmission is performed to ensure good VHF communication. At step 174, GPS position data from the collar is sent to the mobile telephone application by BLE at desired intervals, such as every BLE connection interval or at a time interval just prior to a planned VHF communication. At step 176, a determination is made of whether each collar has a BLE disconnect, such as by a disconnect event or a failure to obtain GPS data by BLE. If the BLE position update is successful and the BLE connection is maintained, the process returns to step 174 to continue updates of GPS position from the collar to the mobile telephone by BLE. If at step 176 a BLE disconnect is detected or the BLE GPS communication fails, then the process continues to step 178 to update GPS position with a VHF transmission by the collar to the adapter and a BLE communication from the adapter to the mobile telephone application. The process continues to step 180 to determine if a BLE connection is re-established. For example, upon having a BLE disconnect, the collar initiates advertising to attempt a re-connection by BLE with the mobile telephone application. In one embodiment, advertisements are at intervals of 10 to 30 seconds to reduce power consumption. If a BLE connect is detected at step 180, the process returns to use BLE for GPS updates. If a BLE connect is not detected, the process returns to step 178 to continue GPS updates with VHF communications. In one embodiment, when BLE communications of GPS position are at the outer ranges supported by BLE, VHF communications may take place with BLE so that GPS positions communicated by BLE are confirmed.

Figure 15:
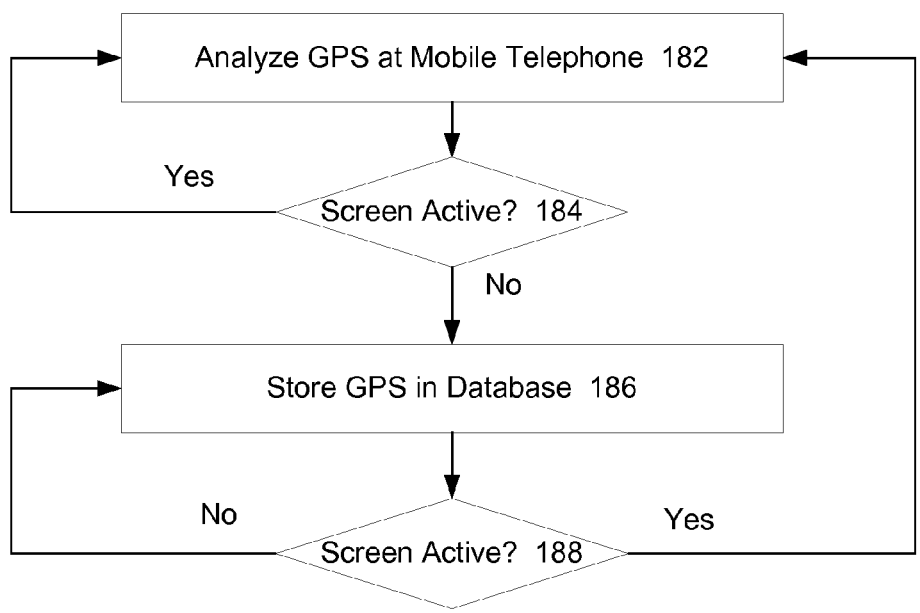
FIG. 15 depicts a flow diagram of an exemplary method for managing power consumption of a mobile telephone or tablet device that track GPS positions from a collar and/or adapter with WPAN communications.

Referring now to FIG. 15, a flow diagram depicts an exemplary method for managing power consumption of a mobile telephone or tablet device that tracks GPS positions from a collar and/or adapter with WPAN communications.

In the field, excessive power usage of the mobile telephone can prevent presentation of GPS position to an end user if too much battery power is consumed at the mobile telephone. An application running on a mobile telephone or tablet that tracks GPS positions consumes power by supporting WPAN communications with an adapter or collar to obtain GPS positions. The application also consumes power by processing the GPS positions to present the position information on a map and by processing position information to create related statistics, such as speed, distance to, direction to, or other factors determined from GPS and/or accelerometer/gyroscope data. In many operating conditions, an end user will have the mobile telephone in a pocket while walking, hunting or performing other activities. When the end user initially looks at the mobile telephone display, the end user typically desires to know position information to find his dog, and then places the mobile telephone back away to continue the end user's activity, such as hunting.

The process depicted by FIG. 15 saves mobile telephone battery power by dividing the gathering of GPS data at the mobile telephone from the analyzing and presentation of GPS data. The gathering of GPS data is done with a small thread that runs on the mobile telephone's processor or on the mobile telephone's WPAN network interface card, such as a firmware thread executing on the BLE stack. At step 182, the process begins by analyzing GPS data at a mobile telephone, such as by presenting GPS positions, paths and statistics on a map at a display of the mobile telephone. The process continues to step 184 to determine if the display screen is active and, if so, returns to step 182 to continue analyzing GPS data. At step 184, the display screen may become inactive if a user turns the display screen off or if a timeout occurs due to a lack of activity, such as user inputs. If the display screen is not active at step 184, the process continues to step 186 to store GPS data received by BLE from the adapter in a database of the mobile telephone without processing the data by other threads of the training application. Step 186 is performed by a small thread that consumes minimal power while other functions of the application rest or enter a sleep mode. In one embodiment, the main processor sleeps while the BLE-to-database thread runs on BLE components, such as in the BLE stack. At step 186, the data may be stored exactly as received at the BLE transceiver or may have parsing performed to convert from the BLE format, such as a comma separated string format into a database format. In one embodiment, GPS data is truncated by removing larger values, such as hemisphere and/or degree and/or minute values, so that an entire latitude and longitude position will fit in single packet sent in a single connection interval of the BLE connection. For example, a "preamble" having the hemisphere, degree and minute data is sent by the adapter to the mobile telephone each time the degree and minute values change so that only more precise data (i.e., minute and decimal values) is sent with each packet. Alternatively, the training application running on the mobile telephone "fills in the blanks" for the GPS position by using the phone GPS position and previous detected collar GPS positions, and assuming the collar can only move so fast and be so far away. The more precise GPS data that arrives at the mobile telephone may be immediately parsed and added to the preamble for storage in the database, or the more precise data may be stored in the database without parsing and adding the preamble so that population of the final position database is delayed until an active screen is again detected. In another embodiment, GPS data is stored in the adapter and sent in periodic large downloads or not downloaded until the screen is active. At step 188, a determination is made of whether the display screen has become active again and, if not, the process continues to step 186. If the display screen becomes active again, the process returns to step 182 to analyze the GPS positions with the application for presentation at the display. Initially, the most recent data is processed and presented so the user has the collars' current position. After the current position is presented, older data may be processed or may be held until a request for the data is made, such as a view of the statistics for the collar over a past time period. In one embodiment, the BLE thread that stores data in the database may include limited logic at step 188 to initiate display screen or other activity. For example, if a flag indicating a point is detected in data, the BLE thread may call the main application to issue a point alert to the end user, such as by sounding a telephone ringer and/or vibrating.

Figure 16:
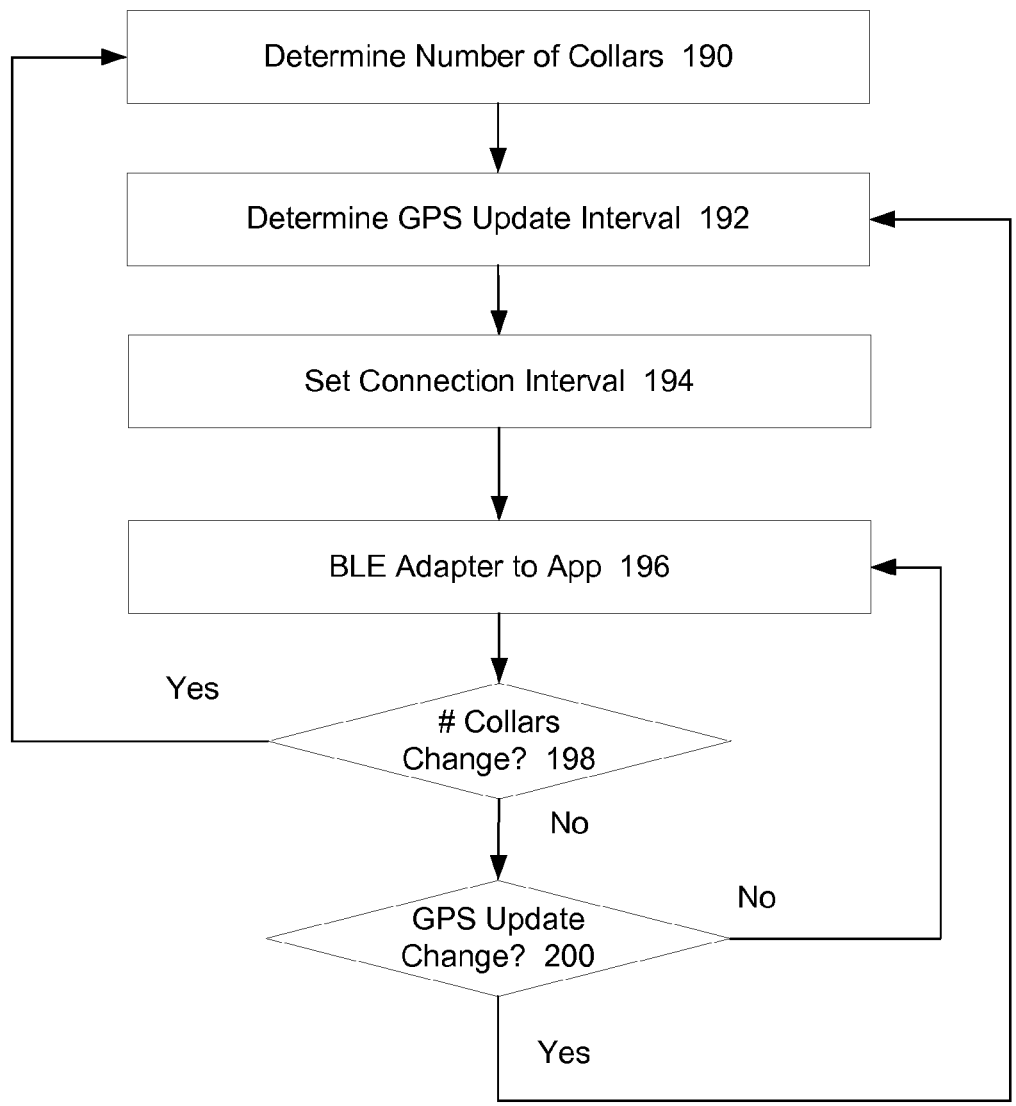
FIG. 16 depicts a flow diagram of an exemplary method for managing power consumption of a mobile telephone, adapter and collar during WPAN communications.

Referring now to FIG. 16, a flow diagram depicts an exemplary method for managing power consumption of a mobile telephone, adapter and collar during WPAN communications. For example, a BLE WPAN communicates with packets sent at regular intervals known as the connection interval. Increasing the connection interval increases the rate at which data updates from a pointer or collar to a mobile telephone application, however, increasing the connection interval also increases the power consumed by the mobile telephone. To preserve power at the mobile telephone, the process of FIG. 16 executes on the mobile telephone, the pointer, and/or the collars to adjust the connection interval based upon the number of collars being supported and the amount of position data being sent. The process starts at step 190 by a determination of the number of collars supported by a pointer. If the process is executed at the application, the application may request the number of collars currently supported from the adapter and/or may include collars detected by BLE communication between the mobile telephone and collars. At step 192, a determination is made of the GPS update interval requested by a user of the application, such as every 1 second out to every 2 minutes. In some embodiments, the GPS update rate may be set based upon a distance traveled by the collar; in such instances, an estimate of expected update intervals based upon the distance may be used. At step 194, a BLE connection interval is set based upon the amount of data estimated to transfer by the BLE connection using the number of collars, the GPS update interval, and the number of packets that each position update will require. For example, two collars that update every 5 seconds with VHF to the adapter and an adapter that sends two BLE packets to the mobile telephone with each collar position update may use a connection interval of 1 second so that the 4 expected packets each send in their own connection interval before the next GPS update occurs. In such an example, a more rapid connection interval may be used to ensure a timely update is performed, such as a connection interval of a quarter of a second. As another example, 10 collars that update every second with each update having 2 BLE packets sent together in one connection interval to a mobile telephone will need a connection interval of at least a tenth of a second. The same set of 10 collars that sends each of the 20 packets in separate connection intervals will need at least a 50 msec connection interval. In determining the connection interval, additional connections may be added to account for overhead, such as commands from the mobile telephone to the pointer or other data sent from the adapter to the mobile telephone.

Once a connection interval is set, the process continues to step 196 to send data collected at the adapter to the mobile telephone with the connection interval. At step 198, a determination is made of whether the number of collars supported by the adapter has changed. If yes, the process returns to step 190 to update the connection interval based upon the number of collars. The number of collars may change if a collar is added or deleted from an interface with the adapter, or may change if a collar that interfaces directly with the mobile telephone by BLE leaves BLE range and initiates a VHF interface through the adapter that increases the number of collars monitored by the adapter (or vice versa). The updated connection interval is sent by a BLE command from the mobile telephone application to the adapter or vice versa, and is initiated on the fly. If the number of collars has not changed, the process continues to step 200 to determine if the GPS update rate has changed. For example, a user might request that collars send GPS position data to the adapter every 2 seconds instead of every 5 seconds or every one second. If the GPS update rate has changed, the process returns to step 192 to determine the GPS update rate and apply the new rate to set an appropriate connection interval. In an alternative embodiment, the GPS update rate may be estimated by logic executing on the adapter device that monitors GPS data queued in the adapter and finds an increased GPS rate if the data queued in the adapter is excessive or is increasing over time. In response to a queue backlog, the adapter decreases the connection interval by sending a connection interval update request. The same logic might increase the connection interval if a number of connections pass without a data transfer. Similarly, the logic may increase slave latency settings when data transfers slow and increase slave latency when data transfers increase. Such an active monitoring of a BLE stack data queue to estimate a GPS update rate might be used where collars update position based on movement and movement becomes large, such as when dogs are running. If the GPS update rate does not change, the process returns to step 196 to continue sending BLE GPS data from the adapter to the mobile telephone.

As an example to illustrate operation of updated connection intervals, a hunter starts with 10 dogs in a field, all within BLE range. BLE GPS updates are provided every 1 second with 5 dogs having a BLE connection directly to the hunter's mobile telephone and 5 dogs broadcast a GPS position from their collars with the positions collected by both the hunter's mobile telephone and the hunter's adapter, which sends the GPS data for those 5 collars to the hunter's mobile telephone by BLE. Initially, the hunter's adapter has a connection interval to send 2 packets for each GPS position of each of the 5 collars that broadcast to the adapter, i.e, at least a tenth of a second to handle 10 connections per second. When the hunter releases the dogs to hunt, the dogs exit BLE range so that GPS position data is communicated by VHF radio from each of the collars to the adapter and then by BLE from the adapter to the mobile telephone. The VHF GPS update rate is every 10 seconds so that the adapter on average must send 2 packets per second to the mobile telephone, allowing an increase of the connection interval to as much as one-half a second. The user increases VHF GPS updates to every second so that the adapter must communicate 20 packets every second to the mobile telephone, resulting in a reset of the connection interval to 50 msec. Finally, the user changes the GPS update to a distance-based update that provides updated position data for each movement of each collar by greater than 10M from the last GPS position transmission. The adapter maintains a 50 msec connection interval but detects a buildup in queued data to send from the adapter to the mobile telephone and so updates to a 20 msec connection interval. The dogs run into a covey of quail and go on point so that GPS updates happen every minute. Connection interval logic on the pointer or mobile telephone detects a slowdown of GPS position updates (such as by knowing that a point indication will slow GPS updates or by monitoring transfers of data) and in response increase the connection interval to one-half a second. The above example presents just one example of how the connection interval logic may adjust connection intervals, and alternative embodiments may adjust connection intervals in various manners. Further, the connection interval logic may be used in other types of BLE systems that have varying demands based upon the number of devices that are supported by BLE communications.

Figure 17:
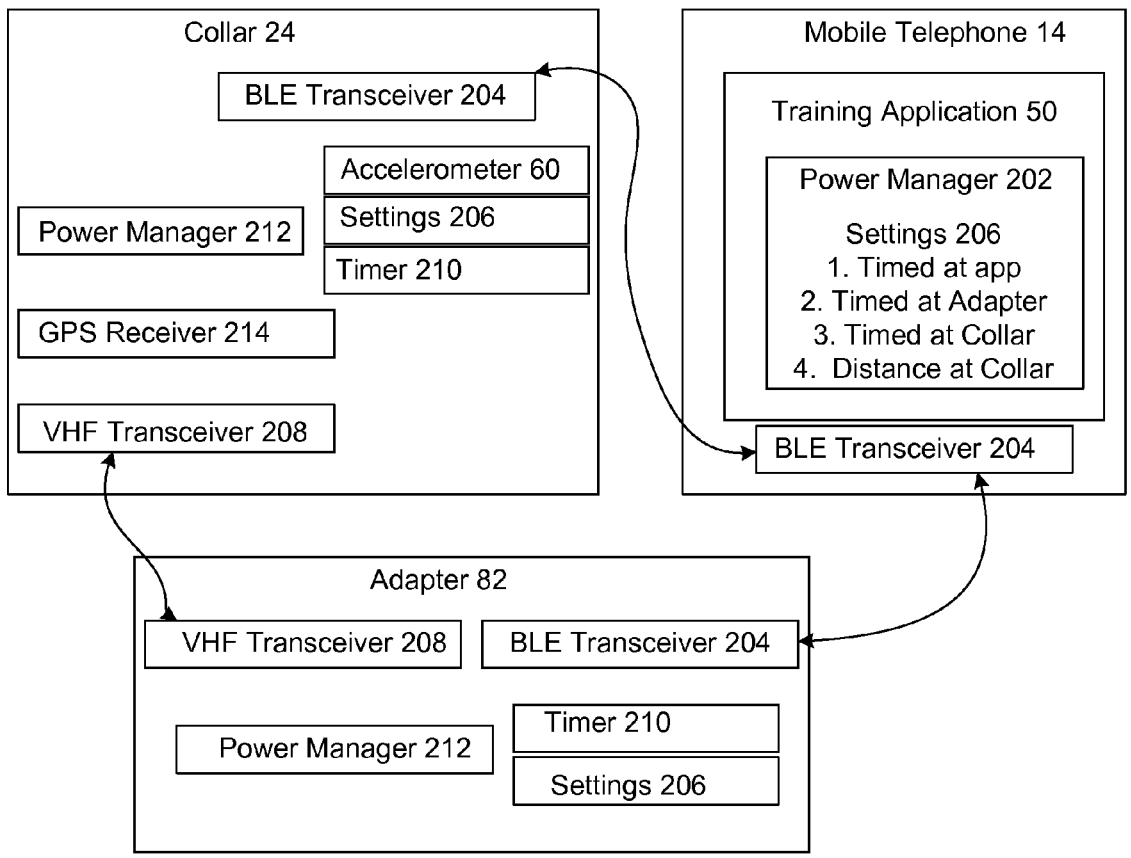
FIG. 17 depicts a block diagram depicts an example embodiment that coordinates communication between a mobile telephone, adapter and collar by WPAN and VHF managed to improve power efficiency.

Referring now to FIG. 17, a block diagram depicts an example embodiment that coordinates communication between a mobile telephone 14, adapter 82 and collar 24 by WPAN and VHF managed to improve power efficiency. A power manager 202 executing as part of an app on mobile telephone 14, such as training application 50, accepts end user power settings, such as those depicted: 1. Timed transmissions controlled at the app; 2. Timed transmissions controlled at adapter 82; 3. Timed transmission controlled at collar 24; and 4. Distance measured at collar 24. Mobile telephone 14 sends the settings 206 selected by the end user to collar 24 and adapter 82, such as by a BLE communication between BLE transceivers 204. A setting that indicates timed communications from the app results in control of VHF communications between VHF transceivers 208 by sending commands from mobile telephone 14 to adapter 82 each time adapter 82 should send a VHF communication requesting a GPS position of collar 24. Thus, for instance, if a user wants GPS positions every 5 seconds, then every 5 seconds mobile telephone 14 sends a BLE command for adapter 82 to request by VHF transceiver 208 a GPS position of collar 24. Mobile telephone 14 can send one command for adapter 82 to communicate with all collars managed by adapter 82, can specify in one command the collars 24 that should be queried by adapter 82, or can command an inquiry to each collar individually by a BLE command to adapter 82 for each collar 24. Timed communications from training application 50 provides rapid response to changes in update rates if changes are requested by an end user and offers control at training application 50 of VHF transmissions so that collar positions known by BLE communications from a collar 24 to mobile telephone 14 are not requested by VHF, thus saving power at collar 24 and adapter 82.

Timed communications by VHF using a timer 210 on adapter 82 operate in similar manner to timed communications managed by mobile telephone 14. Power manager 202 sends a time interval to adapter 82 that adapter 82 applies to command VHF communications each time the time interval passes. For example, mobile telephone 14 sends a 5 second time interval to adapter 82 and adapter 82 commands each collar 24 under its management to report GPS position by VHF communication at each time interval. An advantage of this mode of management is that mobile telephone 14 is able to reduce power consumption by entering a BLE monitoring mode as described above with fewer functions performed by the application and thus less power consumed. In one embodiment, adapter 82 monitors BLE broadcasts by collars 24 of GPS data so that adapter 82 can eliminate VHF requests for collar positions that are available by BLE broadcasts from the collars. In another embodiment, mobile telephone 14 monitors collars 24 by BLE and sets a flag for adapter 82 to prevent VHF requests for collar positions based upon the availability of the collar positions through BLE at mobile telephone 14. Power manager 202 and power managers 212 running on adapter 82 and collar 24 cooperate, for instance to coordinate the power saving processes described above in FIGS. 14-16.

Timed communications from collar 24 are made according to a timer 210 on collar 24 that commands VHF communications to adapter 82 at a time interval in settings 206 provided by BLE command from mobile telephone 14 or by VHF command from adapter 82. Collar 24 includes a power manager 212 that monitors a connection with mobile telephone 14 so that VHF communications from collar 24 may be omitted when collar 24 is able to send GPS position by BLE directly to mobile telephone 14. In each timing case (timed VHF transmissions controlled by the app, the adapter or the collar), VHF transceiver 208 on collar 24 and adapter 82 may sleep in a reduced power consumption state between timed communications to reduce power consumption. Further, GPS receiver 214 on collar 24 may sleep in a reduced power consumption state between BLE and VHF transmissions to reduce power consumption by the GPS receiver and then awaken for a rapid position read immediately before BLE and VHF transmissions to provide adequate time to obtain an accurate GPS position. In one embodiment, wake times for the VHF radio and GPS receiver are synchronized by reference to a GPS clock tracked by the GPS receiver so that GPS positions are resolved a short predetermined time before VHF radio transmissions, and radio transmissions from different collars and the adapter do not interfere with each other. Although the GPS position that is sent from the collar is a position taken slightly before the radio transmission, a consistent delay across all VHF transmissions provides a consistent picture of collar positions relative to each other. When a VHF radio time interval is adjusted, power manager 212 adjusts GPS receiver 214 sleep intervals as necessary to provide an accurate position for the next timed interval radio transmission. The GPS receiver reduced power sleep state maintains information stored in memory that allows a rapid lock of the GPS receiver to satellites while reducing power consumption by not actively processing received GPS signals to determine position. For example, by maintaining a GPS clock signal, last detected position, ephemeral data and almanac in memory and prepared for use by a processor, the GPS receiver is able to rapidly track GPS satellites and determine a position. Over short distances and times, such as less than 2 minute intervals, the GPS receiver essentially switches on processing, determines position and switches processing off so that minimal power is consumed compared with a continual processing of GPS satellite signals during the time period. In one embodiment, one position fix is taken for each VHF radio transmission at a predetermined time before the radio transmission is made. Thus, determining a GPS position substantially only when the position is to be sent while maintaining position resolution data in memory provides rapid and accurate positions with considerable power savings.

In one embodiment, Ublox acquisition, continuous tracking and power optimized tracking (POT) modes are used at collar 24. Adapter 82 sends the VHF radio transmission interval to collar 24 and collar 24 stores the time interval. Collar 24 enters acquisition to obtain a track of enough satellites to resolve GPS position. After position is resolved, collar 24 places the GPS receiver in continuous tracking for more accurate position resolution with the GPS receiver continuously processing received signals to determine GPS position. If reduced power consumption is desired, collar 24 places the GPS receiver in power optimized mode with the GPS receiver timed to start processing data when a VHF request of GPS position is expected. For example, if a 5 second VHF radio position update interval is set, the power optimized tracking is set to resolve GPS position just before the radio update is expected. In an alternative embodiment, the GPS receiver is placed in sleep immediately after a GPS position is taken to be sent or is sent and then awakened to continuous tracking for a brief period before the next radio transmission is sent. A one second or one-half second of continuous tracking (as opposed to minimal processing with power optimized mode) allows a more accurate position resolution before the actual GPS position is sent at a price of slightly more power consumption. In another alternative embodiment, power optimized tracking is used at intermediate time intervals between VHF radio transmissions to maintain tracking information up-to-date, and then continuous tracking is used to generate an accurate GPS position to send by VHF. For instance, power optimized tracking monitors positions every one second and then, one second before a VHF radio transmission is requested, continuous tracking is commanded. Similarly, with the position-based VHF transmission disclosed below, power optimized tracking may be used with one second tracking intervals until continuous tracking is commanded as the appropriate distance is reached to provide an accurate GPS position lock of when the distance from the last transmission is reached. Continuous tracking may be commanded based upon the results of power optimized position locks that show the desired distance of travel is approaching or based upon an estimate of distance traveled measure by accelerometer readings or an estimate from accelerometer and gyroscope readings.

The final of the four settings of position transmissions is based upon distance traveled by collar 24 and may be accomplished alone or in combination with the various timed radio communications. For example, mobile telephone 14, adapter 82 and/or collar 24 may command VHF transmission of position from collar 24 at a relatively lengthy interval, such as every minute. Collar 24 also self-initiates a GPS position transmission when a distance is traveled, such as every 10 meters to every 50 meters. Each transmission based upon a distance traveled resets the timer at mobile telephone 14 to start the time interval count again so that transmissions will occur based upon distance traveled unless no transmission takes place within the time interval, and then the lapse of the time interval will initiate a transmission of position data.

Transmission of GPS position data based upon distance traveled generally involves a comparison of the presently-measured GPS position and the GPS position at the last radio transmission to see if a distance greater than a threshold setting was traveled by collar 24. One difficulty with this technique is that GPS receiver 214 consumes power while tracking the present position to provide the basis for the distance comparison. In order to limit power consumption, power manager 212 performs an estimate of distance traveled based upon accelerations detected by accelerometer 60 and wakes GPS receiver 214 from sleep to continuous tracking to detect current position when the estimated distance traveled approaches the threshold. In one embodiment, a more accurate estimate of distance traveled is obtained by using accelerometer and gyroscope information to act as an inertial navigation system by including vector (direction) analysis with acceleration analysis to determine distance traveled. If, for example, a dog goes on point, then power is preserved by keeping the GPS receiver 214 in standby since the accelerometer detects a lack of change of position.

Figure 18:
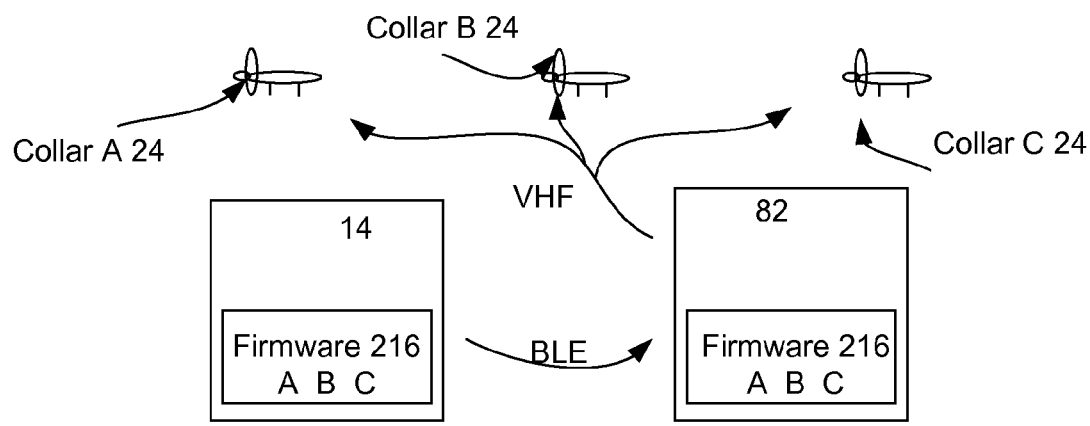
FIG. 18 depicts an example embodiment of an adapter that re-configures with firmware downloads from mobile telephone to manage different types of legacy dog collar devices.

Referring now to FIG. 18, an example embodiment depicts an adapter 82 that re-configures with firmware downloads from mobile telephone 14 to manage different types of legacy dog collar devices. Three different collars 24 (A, B and C) are each supported by a training application running on mobile telephone 14 that communicates by BLE to adapter 82 and by VHF or UHF to collars 24 (A, B, and C). The commands supported by adapter 82 are modified by running firmware 216 that is consistent with a desired collar 24 under control. Mobile telephone 14 issues a command to adapter 82 to boot to an operational state with a desired firmware to interact with a desired collar 24, as long as the desired firmware is loaded in memory of adapter 82. If the desired firmware 216 is not saved in memory of adapter 82, then mobile telephone 14 performs a firmware update by BLE to bring desired firmware 216 to an operational state. Advantageously, firmware updates allow adapter 82 to keep legacy systems that are in customer's hands in operation while allowing customers to transition to new technology.

Figure 19:
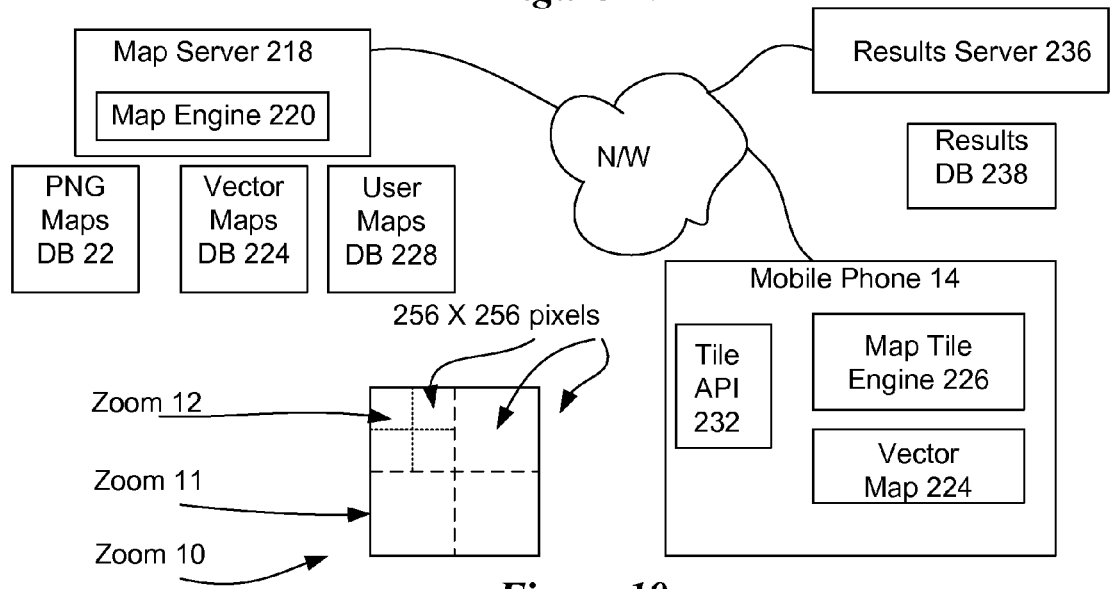
FIG. 19 depicts a block diagram of a system for caching maps on a mobile telephone or tablet device.

Referring now to FIG. 19, a block diagram depicts a system for caching maps on a mobile telephone or tablet device 14. Mobile telephone 14 contacts a map server 218 with coordinates for a map that mobile telephone 14 seeks to cache. A map engine 220 provides maps at desired resolutions by retrieving the maps from an image map file, such as a database of PNG maps 222 that have embedded GPS data, or by generating image map files with GPS data from vector maps of a vector map database 224. The maps are downloaded to mobile telephone 14 and processed by a map tile engine 226 on the mobile telephone 14 that will cache and use the maps as plural tiles usable by web browser mapping APIs, such as Google Maps. In one alternative embodiment, map engine 220 may generate map tiles for a user and store the map tiles in a user map database 228, such as in a compressed form that reduces bandwidth usage at download. As another alternative, map server 220 may download vector maps 224 to mobile telephone 14 so that the mobile telephone 14 that will cache and use the maps can generate map images (i.e., PNG images with GPS data) for map tile engine 226 to apply. For instance GeoPDF vector maps are processed by map tile engine 226 to create PNG maps of different resolutions that are in turn cut into map tiles on mobile telephone 14.

The effect of the example embodiment is to allow one download of a map image for a desired cached area at a desired resolution and then to process the one download into multiple map tile files 230 for the zoom level that a map tile API 232, such as the Google Maps API, can use to present the cached maps in the place of actively downloaded maps, such as Google Maps downloaded through a wireless service provider network. Tiles 230 illustrate how map tiles are maintained at a zoom level with x and y coordinates. The largest zoom level of zero is the entire Earth with 360 degrees. Each increase in zoom level cuts the previous zoom into four squares. For example, zoom level 1 has 180 degrees in each tile for a total of four tiles, a zoom level of 2 has 90 degrees in each tile for a total of 16 tiles. At each zoom level, the tiles are split into squares of 256×256 pixels so that the distance represented by each pixel decreases as the zoom level increase. As wikiopenstreets explains, a total of 20 zoom levels (0 to 19) results in a highest zoom of 19 having 0.0005 degrees per tile with approximately 0.298 meters per pixel based upon an Earth radius of 6372.7982 km at the equator as depicted on a 85.2 DPI monitor. Distance per pixel varies as a location increases or decreases in latitude from the Equator based on a function of the co-sign of the latitude. More precise determinations are possible by applying different mapping techniques and corrections, such as a spherical Mercator projection used by Google.

A maximum zoom of 19 for a Mapnik layer has 274,877,906,944 tiles to cover the Earth. In most instances, hunters will cover areas of around 5 square miles at a time, however, in deep grass or cover a hunter may need a high zoom map to locate a dog even with a precise GPS position. Map tile engine 226 provides high-zoom satellite or topographic maps over small and precisely defined areas by downloading one image of an area at the desired resolution and preparing map tiles on the caching device, i.e., the mobile telephone or tablet that will use the cached maps. For example, a hunter downloads a PNG image of a five square mile area for each desired cached zoom level so that a cached map of zoom levels 16-18 would require only three downloads at three image resolutions. The PNG file downloaded with a resolution that matches zoom level 16 is divided into tiles of 256×256 pixels for zoom level 16 usable by tile API 232 and stored; the PNG file downloaded with a resolution that matches zoom level 17 is divided into tiles of 256×256 pixels for zoom level 17 usable by tile API 232 and stored; and the PNG file downloaded with a resolution that matches zoom level 18 is divided into tiles of 256×256 pixels for zoom level 18 usable by tile API 232 and stored. Alternatively a vector map 224 is converted at the caching device into three PNG files that have resolutions suitable for use at zoom levels 16, 17 and 18, and the three PNG files are then cut up into tiles. The advantage is that a mobile telephone or tablet device that seeks to cache and display maps at higher resolutions is able to do so with fewer downloads of larger files and then is able to use the cache with browser-based APIs, such as Google Maps or Google Earth.

In addition to providing a convenient way to cache maps, a mobile telephone Internet interface provides a convenient way to share results of GPS tracking with other system users. For example, the database of GPS data from tracking a collar is transferred from mobile telephone 14 to a results server 236 and stored in a results database 238. Another user with authorization to access the results can download the results to a mobile telephone 14 having the training application and view the results. For example a trainer who runs a kennel may track a dog's training for a client and post the training so the client can download and view the training. If the trainer makes verbal comments to the mobile telephone or takes a video with the mobile telephone, then marks in the results map allow the client to hit the map at the mark and play the comments or video as the results are presented. Further, real-time tracking of a hunting event, such as a field trial, is supported by having participants download GPS positions to a results database and then feeding the results database to a server that combines all the participants tracking data as the data is received.

Figure 20:
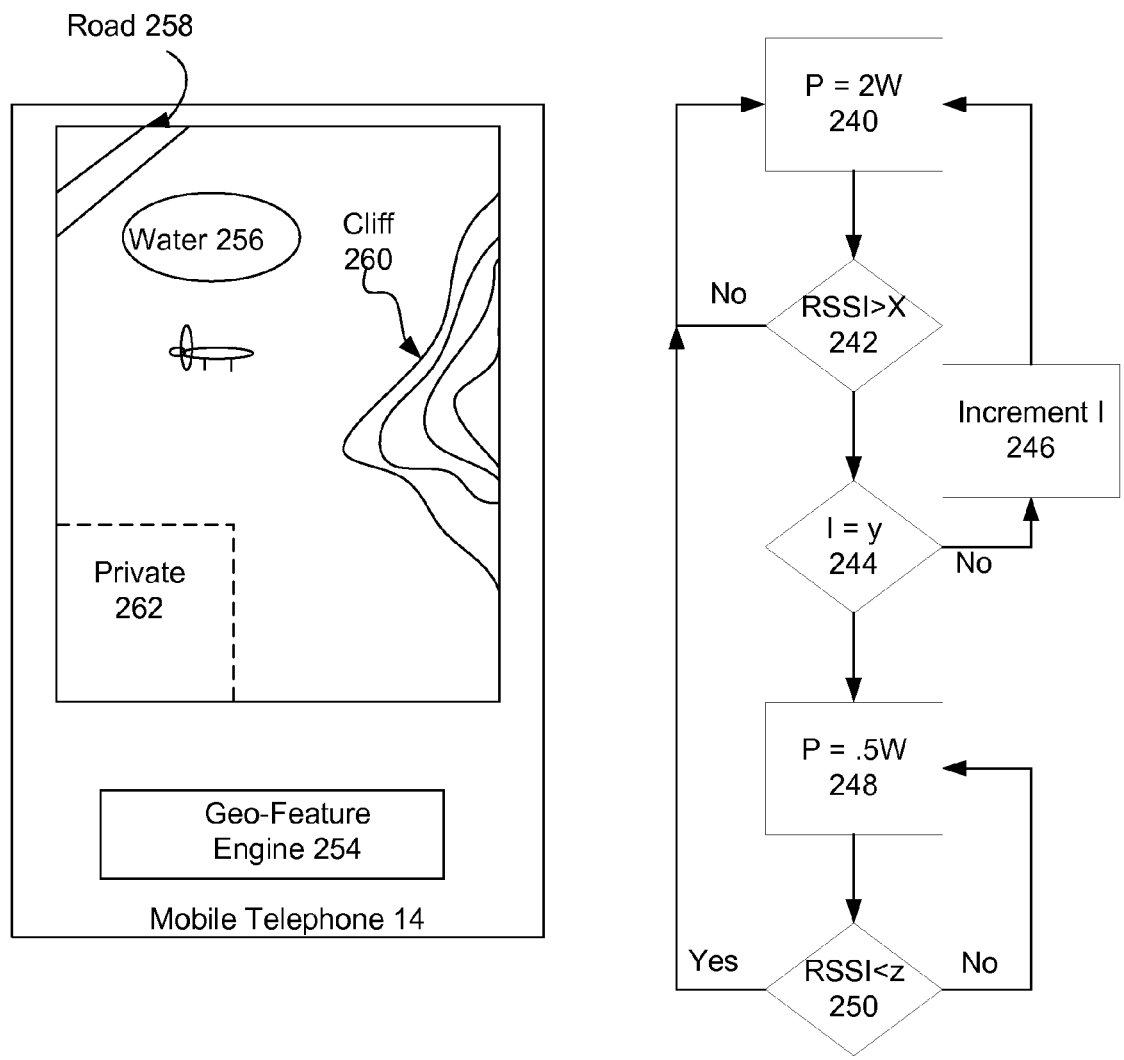
FIG. 20 depicts a flow diagram of a process for adjusting operating conditions at a collar and adapter based upon map features.

Referring now to FIG. 20, a flow diagram depicts a process for adjusting operating conditions at a collar and adapter based upon map features. The flow diagram depicts a two-phase VHF power transmission adjustment as described above that operates in combination with a Smart Hazards Map 252. The process starts at step 240 with VHF power transmission at 2 W, the maximum currently allowed in the 150 MHz MURS public bands. At step 242, a comparison of the return signal strength indicator is made against a threshold. If the return strength is below the threshold, the process returns to step 240 to continue transmissions at 2 W. If the return strength is above the threshold the process continues to step 244 to determine if an incremented counter value is equal to a threshold. If not, the process continues to step 246 to increment the counter value and returns to step 240. If the counter value equals the threshold, the process continues to step 248 to set power at one-half of a Watt. At step 250, a comparison is made of the return signal strength indicator and a threshold to determine if one-half Watt is adequate power. If the return signal is less than a threshold, the process returns to step 240. If the return signal is greater than the threshold, the process returns to step 248. The steps 240 through 250 are performed by a power manager on both the collar and the adapter based on the return signal strength from the opposing VHF radio.

The VHF radio communications rely upon line of sight and tend to have shorter ranges when an antenna is placed at the height of a dog collar. In particular, line of sight communication ranges tend to suffer for the 150 MHz MURS public bands in hilly areas where hills block a radio signal or in populated areas where buildings block radio signals. To address the varying conditions, a geo-feature engine 254 on mobile telephone 14 analyzes geographical features on map 252 and sets RSSI thresholds x and z to different levels so that VHF radio communications are less likely to suffer degradation. For instance, the collar sends GPS latitude and longitude position and also sends GPS elevation position. Mobile telephone 14 geo-feature engine 254 compares the elevation information with the mobile telephone elevation and the elevation of the terrain between the adapter and collar, and resets the values of x and y by BLE to the adapter and by VHF to the collar. Hilly terrain will result in more frequent use of higher VHF transmission power, especially if the elevation of the mobile telephone, collar and terrain indicates that line of sight radio transmissions may be questionable. In contrast, flat terrain will result in more frequent use of lower VHF transmission power. In one embodiment, geo-feature engine 254 simply commands the use of 2 W of power when line of sight communications becomes questionable.

Geo-feature engine 254 offers additional smart hazard map alerts based upon features gleaned from the map, such as with embedded feature indicators or image analysis. Some examples depicted in map 252 include a water alert that lets a hunter know if the dog has approached or entered water 256 indicated on map 252. Another example is a road alert that lets a hunter know if a dog has approached or entered a road 258 indicated on the map. Another example is a cliff hazard alert that let the hunter know if a dog has approached a sharp change in elevation, such as a cliff 260 indicated on a map by tightly packed elevation lines. Another example is a public versus private land alert that warns a hunter of what the boundary is for private land 262 when the hunter is on public land so that the hunter can respect private land rights both for himself and for his dog's position. Alerts may issue into an earpiece of the hunter, as a vibration of mobile telephone 14 or as a different ring tone for each different type of alert.

Although the present disclosure relates to the use of BLE, GPS and VHF radio in a dog collar tracking scenario managed through a smartphone, the use of portions of the disclosure alone or in other types of systems is contemplated, whether or not related to tracking of a dog collar, use on a mobile telephone or tablet, or any other scope.

Although the present invention has been described in detail, it should be understood that various changes, substitutions and alterations can be made hereto without departing from the spirit and scope of the invention as defined by the appended claims.

What is claimed is:

1. A dog training tool comprising:
    a mobile processing device having a WPAN interface;
    an adapter having a WPAN interface operable to communicate with the mobile processing device WPAN interface and a wireless communication module operable to communicate with a wireless radio signal;
    a collar adapted to couple to a dog, the collar having a GPS receiver, a WPAN interface and a wireless communication module, the WPAN interface operable to communicate GPS positions of the GPS receiver to the mobile processing WPAN device and the wireless communication module operable to communicate GPS positions of the GPS receiver to the adapter wireless communication module with the wireless radio signal; and
    a training application stored in memory of the mobile processing device and operable to execute on a processor of the mobile processing device, the training application operable to retrieve the collar GPS positions from the collar by the WPAN interface and from the adapter by the WPAN interface, the adapter retrieving the collar GPS positions from the collar by the adapter wireless communication module with the wireless radio signal, the training application further operable to present the GPS positions at a display of the mobile telephone.

2. The dog training tool of claim 1 wherein the training application is further operable to shut off wireless radio signal communications between the collar and the adapter when collar GPS positions are retrieved by the WPAN interface between the mobile processing device and the collar.

3. The dog training tool of claim 2 wherein the wireless communication signal between the adapter and collar comprises a MURS band frequency of approximately 150 MHz.

4. The dog training tool of claim 3 wherein WPAN comprises Bluetooth Low Energy communication and the training application is further operable to compare the GPS position with hazards presented on the map and issue an alert if the GPS position and hazard has a predetermined condition.

5. The dog training tool of claim 1 wherein the collar sends GPS positions to the adapter by the wireless communication signal at a predetermined timed intervals, the collar further comprising a power manager, the power manager operable to place the GPS receiver in a reduced power state for at least some of the time between the wireless communication signal timed intervals.

6. The dog training tool of claim 1 wherein the collar sends GPS positions to the adapter by the wireless communication signal at predetermined distance change measured at the collar by the GPS receiver.

7. The dog training tool of claim 6 further comprising a power manager on the collar and operable to place the GPS receiver in a reduced power state between the wireless communication signals sent by the wireless communication module, the power manager estimating distance traveled by the collar based upon accelerations sensed by an accelerometer and bringing the GPS receiver out of the reduced power state when the estimated distance approaches predetermined distance change.

8. The dog training tool of claim 6 further comprising:
    plural accelerometers;
    plural gyroscopes;
    an integrator disposed on the dog collar, the integrator operable to analyze accelerations sensed by the plural accelerometers and orientations sensed by the plural gyroscopes to estimate the predetermined distance change; and a power manager operable to place the GPS receiver in a reduced power state for at least some of the time between the predetermined distance change.

9. A method for communicating position information from a collar, the method comprising:

gathering position information at the collar with a GPS receiver;

sending the GPS positions from the collar to a mobile processing device by a WPAN interface between the collar and the mobile processing device;

detecting a disconnection event associated with the WPAN interface; and in response to the detecting, sending the GPS positions from the collar to the mobile processing device by a VHF wireless signal.

10. The method of claim 9 further comprising:

determining at the collar a delay between sending a first GPS position and sending a second GPS position; and placing the GPS receiver in a reduced power sleep state during at least part of the delay.

11. The method of claim 10 wherein the determining at the collar a delay further comprises:

determining a time interval between the VHF wireless signals to communicate the first and second GPS positions; and placing the GPS receiver in the reduced power sleep state during at least part of the time delay.

12. The method of claim 10 wherein the determining at the collar a delay further comprises:

determining that the collar transmits the second GPS position at a predetermined distance from the first GPS position;

placing the GPS receiver in a reduced power sleep state after the first GPS position is determined;

monitoring accelerations at the collar to estimate that the collar has the predetermined distance; and in response to estimating that the collar has the predetermined distance, waking the GPS receiver to measure the GPS position.

13. The method of claim 12 further comprising:

detecting that a predetermined time without a VHF wireless signal sending a GPS position from the collar; and in response to detecting, commanding a VHF wireless signal to send a GPS position from the collar.

14. The method of claim 13 wherein the in response to the detecting, sending the GPS positions from the collar to the mobile processing device by a VHF wireless signal further comprises:

sending the VHF wireless signal from the collar to an adapter having a VHF wireless transceiver and a WPAN interface with the mobile processing device; and sending the GPS position from the adapter with a WPAN interface.

15. The method of claim 14 wherein plural collars send a GPS position to the adapter and the adapter sends the GPS positions to the mobile processing device by the WPAN interface, the method further comprising:

determining at the mobile processing device the number of collars and a time interval that the collars use to send the GPS positions; and adjusting a connection interval of the WPAN interface by analyzing the number of collars and time interval.

16. The method of claim 14 wherein plural collars send a GPS position to the adapter and the adapter sends the GPS positions to the mobile processing device by the WPAN interface, the method further comprising:

determining at the adapter a predetermined queue of GPS positions to send by the WPAN interface to the collar; and in response to determining, adjusting a connection interval of the WPAN interface to increase the rate at which GPS positions are sent through the WPAN interface.

17. A system for training a dog, the system comprising:

a mobile processing device having a processor, memory, WPAN interface and display, the mobile processing device operable to the mobile telephone having a GPS receiver operable to present the position of the mobile processing device on a map presented at the display;

plural dog collars, each dog collar having a GPS receiver operable to determine the position of the dog collar, a WPAN interface and at least one wireless communication device to communicate the position of the dog collar with a wireless communication signal; and an adapter operable to receive the position from the plural dog collars with the wireless communication signals and to communicate the position of the dog collar to the mobile processing device through the WPAN for presentation of the dog collar position at the display;

wherein the mobile processing device is further operable to selectively receive the GPS position from only one of the WPAN interface with a collar or the WPAN interface with the adapter, and to shut off wireless communication signals between the selected one or more of the plural dog collars and the adapter if the mobile processing device obtains the GPS positions of the selected one or more of the plural collars from the WPAN interface.

18. The system of claim 17 wherein each of the plural dog collars includes a power manager to place the GPS receiver in a reduced power state between wireless communication signals, the reduced power state maintaining a GPS clock signal, last detected position and ephemeral data in memory for rapid reacquisition of a current GPS position.

19. The system of claim 17 wherein the mobile processing device is further operable to extract GPS time, position and ephemeral data from the mobile processing device and communication the GPS time, position and ephemeral data to at least one of the plural collars to hot start the GPS receiver of the at least one of the plural collars.

20. The system of claim 17 wherein the adapter and mobile processing device cooperate to establish a connection interval for the WPAN between the mobile processing device and adapter based at least in part on the number of the plural collars sending GPS information to the adapter.

* * * * *